(12) United States Patent
Muralidhara et al.

(10) Patent No.: US 12,494,192 B2
(45) Date of Patent: Dec. 9, 2025

(54) TECHNIQUES FOR AUDIO FEATURE DETECTION

(71) Applicant: HARMAN INTERNATIONAL INDUSTRIES, INCORPORATED, Stamford, CT (US)

(72) Inventors: Harikrishna Muralidhara, Bangalore (IN); George Jose, Bengaluru (IN); Jigar Mistry, Ahmedabad (IN); Rajesh Kumar Sahoo, Bangalore (IN); Srinivas Kruthiventi Subrahmanyeswara Sai, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 203 days.

(21) Appl. No.: 17/375,927

(22) Filed: Jul. 14, 2021

(65) Prior Publication Data
US 2023/0017728 A1 Jan. 19, 2023

(51) Int. Cl.
G10L 15/02 (2006.01)
G10L 15/22 (2006.01)

(52) U.S. Cl.
CPC ........ *G10L 15/02* (2013.01); *G10L 2015/025* (2013.01); *G10L 15/22* (2013.01)

(58) Field of Classification Search
CPC ... G10L 15/02; G10L 15/22; G10L 2015/025; G10L 15/07; G10L 25/48; G10L 15/063; G10L 15/08; G06N 3/08
See application file for complete search history.

(56) References Cited

U.S. PATENT DOCUMENTS 6,535,849 B1 * 3/2003 Pakhomov ............ G10L 15/063
704/E15.008
9,542,948 B2 1/2017 Roblek et al.
(Continued)

FOREIGN PATENT DOCUMENTS

WO 2020005202 A1 1/2020

OTHER PUBLICATIONS

Sun, Sining, et al. "Training augmentation with adversarial examples for robust speech recognition." arXiv preprint arXiv:1806.02782 (2018), pp. 1-15 (Year: 2018).*
(Continued)

*Primary Examiner* — Jesse S Pullias
*Assistant Examiner* — Michael C. Lee
(74) *Attorney, Agent, or Firm* — Artegis Law Group, LLP

(57) ABSTRACT

Training a user-specific perturbation generator for an audio feature detection model includes receiving one or more positive audio samples of a user, each of the one or more positive audio samples including an audio feature; receiving one or more negative audio samples of the user, each of the one or more negative audio samples sharing an acoustic similarity with at least one of the one or more positive audio samples; and adversarially training a user-specific perturbation generator model to generate a user-specific perturbation, the training based on the one or more positive audio samples and the one or more negative audio samples. Perturbing audio samples of the user with the user-specific perturbation can cause an audio feature detection model to recognize the audio feature in audio samples that include the audio feature and/or to refrain from recognizing the audio feature in audio samples that do not include the audio feature.

14 Claims, 7 Drawing Sheets

(56) References Cited

U.S. PATENT DOCUMENTS

| | | | |
|---|---|---|---|
| 10,438,593 | B2 | 10/2019 | Alvarez Guevara |
| 10,872,599 | B1* | 12/2020 | Wu .................... G10L 15/08 |
| 2012/0163622 | A1* | 6/2012 | Karthik ................ H04R 3/005 |
| | | | 381/94.1 |
| 2013/0144623 | A1* | 6/2013 | Lord .................... G09B 21/006 |
| | | | 704/E15.001 |
| 2016/0012823 | A1* | 1/2016 | Roos ................ G06Q 20/40145 |
| | | | 704/239 |
| 2018/0182390 | A1* | 6/2018 | Hughes .................. G10L 15/02 |
| 2018/0261213 | A1* | 9/2018 | Arik ...................... G10L 15/063 |
| 2019/0051299 | A1* | 2/2019 | Ossowski .............. G10L 15/22 |
| 2019/0082276 | A1* | 3/2019 | Crow .................... H04R 25/505 |
| 2019/0251960 | A1 | 8/2019 | Maker et al. |
| 2019/0261910 | A1* | 8/2019 | Yoshikawa ........... A61B 5/7264 |
| 2019/0325861 | A1* | 10/2019 | Singh ...................... G06N 3/044 |
| 2020/0014375 | A1* | 1/2020 | Arimura ................ H03K 19/20 |
| 2020/0118558 | A1* | 4/2020 | Wightman .............. G10L 15/10 |
| 2021/0020162 | A1 | 1/2021 | Griffin et al. |
| 2021/0097982 | A1* | 4/2021 | Nowak-Przygodzki ..................... |
| | | | G06F 16/9035 |
| 2021/0183367 | A1* | 6/2021 | Sharifi .................. G10L 15/063 |
| 2022/0115000 | A1* | 4/2022 | Beaufays .............. G10L 13/047 |
| 2022/0139373 | A1* | 5/2022 | Weisz .................... G10L 15/07 |
| | | | 704/231 |
| 2022/0165253 | A1* | 5/2022 | Sharifi .................... G10L 15/30 |
| 2022/0366901 | A1* | 11/2022 | Rathaur ................ G06F 16/245 |

OTHER PUBLICATIONS

Wang, Xiong, et al. "Virtual adversarial training for DS-CNN based small-footprint keyword spotting." 2019 IEEE Automatic Speech Recognition and Understanding Workshop (ASRU). IEEE, 2019, pp. 607-612. (Year: 2019).*

Wang, Xiong, et al. "Adversarial examples for improving end-to-end attention-based small-footprint keyword spotting." ICASSP 2019-2019 IEEE International Conference on Acoustics, Speech and Signal Processing (ICASSP). IEEE, 2019, pp. 6636-6370 (Year: 2019).*

Hossain, Delowar, et al.. "Efficient corpus design for wake-word detection." 2021 IEEE Spoken Language Technology Workshop (SLT). IEEE (Mar. 25, 2021), pp. 1094-1100 (Year: 2021).*

Mathur, Akhil, et al. "Using deep data augmentation training to address software and hardware heterogeneities in wearable and smartphone sensing devices." 2018 17th ACM/IEEE International Conference on Information Processing in Sensor Networks (IPSN). IEEE, 2018, pp. 200-211 (Year: 2018).*

Definition of "Perturbation" at Dictionary.com, available at https://web.archive.org/web/20210615132017/https://www.dictionary.com/browse/perturbation (archived Jun. 15, 2021). (Year: 2021).*

Shahnawazuddin, S., et al. "In-domain and out-of-domain data augmentation to improve children's speaker verification system in limited data scenario." ICASSP 2020-2020 IEEE International Conference on Acoustics, Speech and Signal Processing (ICASSP). IEEE, 2020, pp. 7754-7758 (Year: 2020).*

López-Espejo, Iván, et al. "Improved external speaker-robust keyword spotting for hearing assistive devices." IEEE/ACM Transactions on Audio, Speech, and Language Processing 28 (2020), pp. 1233-1247 (Year: 2020).*

Wang, Jingsong, et al. "Auto-KWS 2021 Challenge: Task, datasets, and baselines." arXiv preprint arXiv:2104.00513 (Mar. 31, 2021), pp. 1-5 (Year: 2021).*

Liu, Yuchen, et al. "Defending against microphone-based attacks with personalized noise." Proceedings on Privacy Enhancing Technologies (Jan. 29, 2021), pp. 130-150 (Year: 2021).*

S. Sun, et al., "Domain Adversarial Training for Accented Speech Recognition," 2018 IEEE International Conference on Acoustics, Speech and Signal Processing (ICASSP), 2018, pp. 4854-4858. (Year: 2018).*

Chen, Yi-Chen, et al. "Aipnet: Generative adversarial pre-training of accent-invariant networks for end-to-end speech recognition." ICASSP 2020-2020 IEEE International Conference on Acoustics, Speech and Signal Processing (ICASSP). IEEE, 2020 (Year: 2020).*

Aloufi, Ranya, et al. "Privacy-preserving voice analysis via disentangled representations." Proceedings of the 2020 ACM SIGSAC conference on cloud computing security workshop. 2020. (Year: 2020).*

Kumar, Kshitiz, et al. "Non-negative intermediate-layer DNN adaptation for a 10-kb speaker adaptation profile." 2016 IEEE International Conference on Acoustics, Speech and Signal Processing (ICASSP). IEEE, 2016 (Year: 2016).*

Gupta, Udit, et al. "Masr: A modular accelerator for sparse rnns." 2019 28th International Conference on Parallel Architectures and Compilation Techniques (PACT). IEEE, 2019 (Year: 2019).*

Liu, Xiao, et al. "Layerwise sparse coding for pruned deep neural networks with extreme compression ratio." Proceedings of the AAAI Conference on Artificial Intelligence. vol. 34. No. 04. 2020 (Year: 2020).*

Miao et al., "Speaker Adaptive Training of Deep Neural Network Acoustic Models using I-vectors", IEEE/ACM Transactions on Audio, Speech, and Language Processing, 13 pages.

Zhao et al., "Domain and Speaker Adaptation for Cortana Speech Recognition", Microsoft Corporation, One Microsoft Way, Redmond, WA 98052, USA, 5 pages.

Li et al., "Adversarial Music: Real World Audio Adversary Against Wakeword Detection System", arXiv:1911.00126v3 [cs.CR] Dec. 6, 2019, 11 pages.

* cited by examiner

TECHNIQUES FOR AUDIO FEATURE DETECTION

BACKGROUND

Field of the Various Embodiments

The various embodiments relate generally to computing devices and, more specifically, to audio feature detection.

DESCRIPTION OF THE RELATED ART

Virtual assistant technology, which is also commonly referred to as personal assistant technology or intelligent personal assistant technology, is a growing technology area. A personal assistant agent interfaces with a corresponding personal assistant service to perform various tasks or services for a user. A user can interact with a personal assistant agent via a device, such as a smartphone, smart speaker, or in-vehicle infotainment system. The personal assistant agent can connect to other devices and/or to various online resources (e.g., search engines, databases, e-commerce sites, a personal calendar, etc.) via a corresponding personal assistant service to perform various tasks and services. Examples of the tasks that can be performed include one or more of operating a device, performing a search, making purchases, providing recommendations, and setting calendar appointments. Examples of personal assistant technology include ALEXA® by Amazon.com, Inc., GOOGLE® ASSISTANT by Google LLC, SIRI® by Apple Inc., and CORTANA® by Microsoft Corporation.

A device that implements a particular personal assistant agent can be configured to interface with a user by monitoring audio input. In some cases, the device can be configured to monitor input from one or more microphones, to detect an instance of an audio feature generated by the user, where the instance of the audio trigger indicates an intent of the user to interact with the device. In some such cases, the audio trigger can be a wakeword, such as a name of the device that is assigned by the manufacturer or chosen by the user, or a word or phrase indicating a query or command directed to a device. During an enrollment phase, the device can train an audio trigger detection model using one or more positive audio samples of the user, each of the one or more positive audio samples including the audio feature, such as the user repeatedly speaking a wakeword. During a detection phase, the device can process an audio sample of the user with the audio feature detection model to recognize the audio feature in the audio sample. Based on the recognizing, the device can process the audio sample to detect, in the audio following the audio feature, an instance of an expression, such as a command, request, inquiry, etc., generated by the user as part of the interaction with the device. The device can further process the audio sample to understand the expression and to generate information or take action based on the expression, such as generating audio output that provides information or indicates to the user the completion, success, failure, etc. of the response of the device to the expression.

One drawback of such devices is that different users can speak an expression in different ways, for example, due to an accent, a dialect, a manner of speech, such as a rate of speech, and/or the like. Speech differences can cause an intelligent personal assistant agent interfaces to fail to recognize the audio feature in an audio sample of the user (i.e., a false negative) and/or to recognize other words as the audio feature (i.e., a false positive). For example, a negative audio sample not including the audio feature, but including a word or phrase that is acoustically similar to the audio feature when spoken in a particular accent or dialect, or when spoken by a user with a particular manner of speech, such as a rate of speech, etc. In such cases, the device can receive a negative audio sample of the user not including the audio feature but including the acoustically similar expression and can reach a false positive determination that the audio sample includes an instance of the audio feature. Based on a false positive determination, the device can receive and further sample the audio input of additional expressions by the user, and can generate an audio response, which can surprise or frustrate the user.

As the foregoing illustrates, what is needed are more effective techniques for reducing false negatives and false positives during audio feature detection.

DETAILED DESCRIPTION

One embodiment sets forth a computer-implemented method of training a user-specific perturbation generator for an audio feature detection model. The method includes receiving one or more positive audio samples of a user, each of the one or more positive audio samples including an audio feature. The method also includes receiving one or more negative audio samples of the user, each of the one or more negative audio samples sharing an acoustic similarity with at least one of the one or more positive audio samples. The method also includes adversarially training a user-specific perturbation generator model to generate a user-specific perturbation, the training based on the one or more positive audio samples and the one or more negative audio samples. Based on the method, perturbation of audio samples of the user with the user-specific perturbation causes an audio feature detection model to recognize the audio feature in audio samples of the user that include the audio feature and to refrain from recognizing the audio feature in audio samples of the user that do not include the audio feature.

Further embodiments provide, among other things, a system and a non-transitory computer-readable medium configured to implement the method set forth above.

Another embodiment sets forth a system that determines an interaction between a user and a device. The system includes a memory storing instructions. The system includes one or more processors that execute the instructions to perform steps including receiving an audio sample from a user, receiving a user-specific perturbation associated with the user, and determining whether the audio sample includes an audio feature based on the audio sample and the user-specific perturbation.

Further embodiments provide, among other things, a computer-implemented and a non-transitory computer-readable medium configured to implement the system set forth above.

At least one technical advantage of the disclosed techniques relative to the prior art is that, with the disclosed techniques, a device such as an intelligent personal assistant exhibits a reduced false negative rate of recognizing the audio feature in audio samples of the user, and/or a false positive rate of recognizing the audio feature in a negative audio sample of the user not including the audio feature, due to an acoustic similarity between one or more positive audio samples of the user that include the audio feature and negative audio samples of the user sharing an acoustic similarity with at least one of the one or more positive audio samples of the user. The reduced false negative rate can improve the responsiveness of the device to the user. The reduced false positive rate can conserve battery life or unnecessary processing of the device. Further, interactions between the user and the intelligent personal assistant are improved due to a reduced rate of the device listening to and responding to the user when not intended by the user, resulting in a higher-confidence user experience. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts can be practiced without one or more of these specific details.

Figure 1:
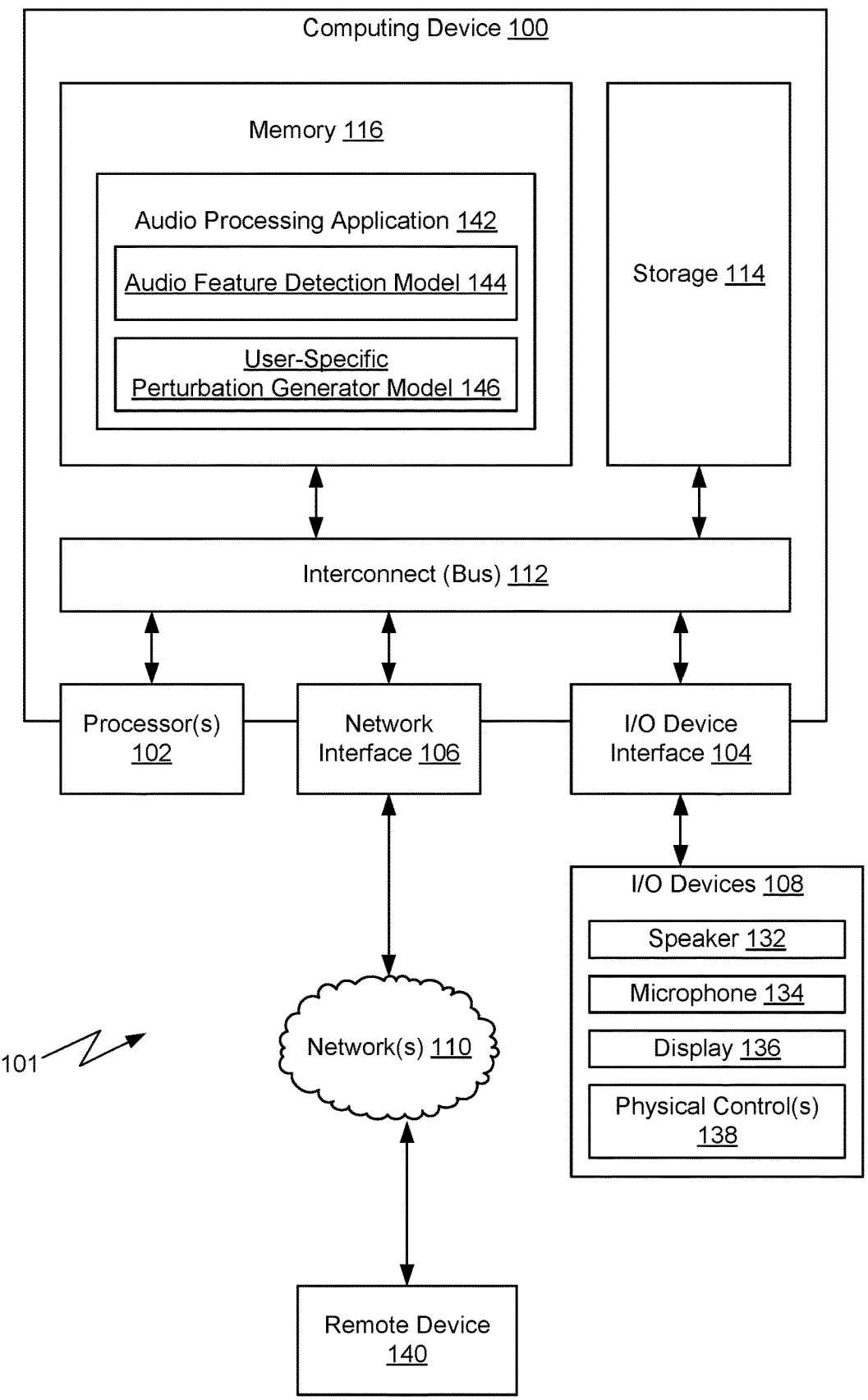
FIG. 1 illustrates a computing device configured to implement one or more aspects of the various embodiments.

FIG. 1 illustrates a computing device 100 configured to implement one or more aspects of the various embodiments. Computing device 100 can be a desktop computer, a laptop computer, a smartphone, a personal digital assistant (PDA), a tablet computer, a smart speaker, or any other type of computing device suitable for practicing one or more aspects of the various embodiments. In some embodiments, computing device 100 is an intelligent personal assistant. It is noted that the computing device described herein is illustrative and that any other technically feasible configurations fall within the scope of the various embodiments.

As shown, computing device 100 includes, without limitation, an interconnect (bus) 112 that connects one or more processor(s) 102, an input/output (I/O) device interface 104 coupled to one or more input/output (I/O) devices 108, memory 116, a storage 114, and a network interface 106. Processor(s) 102 can be any suitable processor, such as a central processing unit (CPU), a graphics processing unit (GPU), an application-specific integrated circuit (ASIC), a field programmable gate array (FPGA), a digital signal processor (DSP), and/or any other type of processing unit, or a combination of different processing units, such as a CPU configured to operate in conjunction with a GPU. In general, processor(s) 102 can be any technically feasible hardware unit capable of processing data and/or executing software applications.

I/O devices 108 can include devices capable of providing input, such as a keyboard, a mouse, a touch-sensitive screen, and so forth, as well as devices capable of providing output, such as a display device. In some embodiments, I/O devices 108 include an audio speaker 132 (and/or a similar audio output device, such as headphones), a microphone 134, a display device 136, and one or more physical controls 138 (e.g., one or more physical buttons, one or more touchscreen buttons, one or more physical rotary knobs, etc.). Additionally, I/O devices 108 can include devices capable of both receiving input and providing output, such as a touchscreen, a universal serial bus (USB) port, and so forth. I/O devices 108 can be configured to receive various types of input from a user of computing device 100 (e.g., receiving audio input, such as voice input, via microphone 134). I/O devices 108 can also provide various types of output to the end-user of computing device 100, such as displayed digital images or digital videos or text on display device 136 and/or outputting audio via audio speaker 132. In some embodiments, one or more of I/O devices 108 are configured to couple a first computing device 100 to a second device (not shown). For example, I/O devices 108 can include a wireless and/or wired interface (e.g., a Bluetooth interface, a Universal Serial Bus interface) to/from another device (e.g., a smartphone).

Storage 114 can include non-volatile storage for applications and data and can include fixed or removable disk drives, flash memory devices, and CD-ROM, DVD-ROM, Blu-Ray, HD-DVD, or other magnetic, optical, or solid-state storage devices. Additionally, in some embodiments, one or more data stores, such as databases of audio samples, databases of phonemes for text-to-speech conversion, and training data for voice recognition and/or speech-to-text conversion, can be stored in storage 114.

Memory 116 can include a random-access memory (RAM) module, a flash memory unit, or any other type of memory unit or combination thereof. Processor(s) 102, input/output (I/O) device interface 104, and network interface 106 are configured to read data from and write data to memory 116. Memory 116 includes various software programs (e.g., an operating system, one or more applications) that can be executed by processor(s) 102 and application data associated with the software programs.

In some embodiments, computing device 100 is included in a computing network environment 101 that also includes network(s) 110, which may include one or more remote devices 140. Network(s) 110 can be any technically feasible type of communications network that allows data to be exchanged between computing device 100 and external entities or devices, such as a web server, or another networked computing device or system. For example, network(s) 110 can include a wide area network (WAN), a local area network (LAN), a wireless network (e.g., a WiFi network), and/or the Internet, among others. Computing device 100 can connect with network(s) 110 via network interface 106. In some embodiments, network interface 106 is hardware, software, or a combination of hardware and software, that is configured to connect to and interface with network(s) 110.

In some embodiments, the computing device 100 can interact with one or more remote devices 140 that provide one or more cloud computing systems (e.g., server systems) remote from computing device 100. The computing device 100 can receive requests from users and perform one or more tasks in response to requests from a user. Examples of tasks that can be performed by the computing device 100, alone or in cooperation with the one or more remote devices 140, include, without limitation, obtaining search results or answers (e.g., via a search engine or a database) in response to user queries, accessing one or more resources (not shown) to obtain data (e.g., obtaining an email message, obtaining a calendar event, obtaining a to-do list item), creating or modifying data at one or more resources (e.g., composing an email message, modifying a calendar event, removing a to-do list item), and issuing instructions to devices to perform certain operations or execute certain functions (e.g., instructing a smart thermostat to adjust the heating set point, instructing a speaker to play a song).

In some embodiments, a computing device 100 can include an audio processing application 142 that enables the computing device 100 to interact with a user. For example, the audio processing application 142 can receive requests in an audio format (e.g., audio samples of requests) and return responses that include audio samples (and/or data associated with audio samples) that are to be outputted to users. As a first example, a user could issue a voice input that includes a request. A computing device 100 could receive an audio sample that includes the request. The computing device 100 could then process the request, for example, using an audio feature detection model 144 of the audio processing application 142, which can be trained to detect the audio features in audio samples and to return corresponding responses that include audio output (e.g., voice output, text-to-speech output). As a second example, a user could issue voice input that includes a request, and the voice input could be converted into text by a speech-to-text module. A computing device 100 could then process the text request and return a response which includes text that is output to the user. One such audio processing application 142 that can receive requests and/or return responses is an intelligent personal assistant, as previously discussed. Other examples include, for example, voice-enabled media vehicle interfaces; voice-enabled media systems, such as audio and/or video presentation devices; voice-enabled game consoles; voice-enabled wearable devices, or the like.

In some scenarios, a device can receive an audio sample, such as voice input, in which one or more features can be recognized by the device. For example, a user can speak a wakeword to activate the device from a standby mode, such as at the beginning of a word, phrase, or expression of a request or command directed by the user to the device. The device can monitor audio input (such as received by one or more microphones) to recognize the audio features of the audio sample and can perform further processing based on a detection of the audio feature and, optionally, other features of the audio sample, such as a wakeword and one or more words that precede or follow the wakeword. The device can use a variety of techniques to perform such detection, such as (for example) using frequency analysis to compare a waveform of an audio sample of the audio input and a waveform of the audio feature to be detected, and/or phonetic analysis to detect a sequence of phonemes in the audio sample and to compare the sequence with a sequence of phones of the audio feature to be detected. If such comparisons indicate that the audio sample and the audio feature to be detected are similar (e.g., within a similarity threshold), the device can determine that audio sample includes the audio feature. Further, the device can respond to a detection of the audio feature, such as processing a natural-language expression of the user to determine a query and to generate and deliver a response to the query.

More particularly, a device can include an audio feature detection model 144 that has been trained to detect an audio feature based on one or more positive audio samples, each of the one or more positive audio samples including the audio feature. For example, a machine learning model, such as a recurrent neural network (RNN), can be trained with a set of one or more positive audio samples in which an individual (such as a typical user) speaks a wakeword. One or more labels can identify an instance of the audio feature within each positive audio sample (e.g., a beginning, end, length, and/or duration of a portion of each positive audio sample in which the audio feature occurs). The machine learning model can be trained to generate, based on one or more positive audio samples and the label, an output that indicates a detection of the audio feature in each of the one or more positive audio samples. Additionally, negative samples can be provided (e.g., audio samples in which the user is not speaking the wakeword) with a label indicating that the audio sample does not include the feature. The machine learning model can be trained to generate, based on each of the one or more negative audio samples and the corresponding label, an output that does not indicate a detection of the audio feature in each of the one or more negative audio samples. After successful training, the audio feature detection model 144 can be deployed to process audio samples to detect an occurrence of the audio feature in an unlabeled audio sample (e.g., unlabeled audio samples of a user received by one or more microphones, which may or may not include an audio feature such as a wakeword), and to classify the unlabeled audio samples as either including or not including the feature based on the training. It is noted that the audio feature detection model 144 described herein is illustrative and that any other technically feasible techniques for detecting an audio feature of an audio sample fall within the scope of the various embodiments.

A first concern with audio feature detection model 144 is the occurrence of false negatives, in which a user provides an audio sample including the audio feature, but the device fails to detect the audio feature in the audio sample, due to aspects of the speech of the user. For example, a device can store a waveform of a wakeword as spoken by a first individual (such as a typical user) and can compare the waveform of the wakeword with the waveform of an audio sample of a second individual (such as a specific user of the device). If the second individual speaks the wakeword differently than the first individual, such as speaking with an accent, in a regional dialect, in a certain manner of speech (e.g., rate, volume, or pitch), or the like, the audio feature detection model 144 could determine that the waveform of the wakeword spoken by the first individual (as the audio feature to be detected) is dissimilar to the waveform of the audio sample of the second individual (such as an audio sample of a user of the device). Due to a false negative detection, the device could fail to detect the audio feature in the audio sample and could fail to respond to the audio sample of the user. As a result, the user could have to repeat the audio sample (e.g., repeat the wakeword) to receive a response from the device.

A second concern with audio feature detection models 144 is the occurrence of false positives, in which a device detects an audio feature in an audio sample of a user who did not intend to provide the audio feature (e.g., recognizing a wakeword in speech of an individual who did not intend to speak the wakeword to interact with the device), due to aspects of the speech of the user. For example, the user can provide an audio sample that does not include the audio feature (e.g., a wakeword), but instead includes a word or phrase that is acoustically similar to (e.g., within an acoustic similarity threshold of) an audio feature to be detected in the audio sample. In some cases, this acoustic similarity could occur due to an accent, in a regional dialect, in a certain manner of speech (e.g., rate, volume, or pitch), or the like, in which an audio sample of the user is acoustically similar to an audio feature to be detected, such as a wakeword. As a result, an audio feature detection models 144 could determine that a waveform and/or phonetic sequence of the audio sample of the user and a waveform and/or phonetic sequence of the audio feature to be detected are acoustically similar (e.g., within an acoustic similarity threshold), and could incorrectly determine that the audio sample includes the audio feature to be detected. Due to a false positive determination, the device could receive and further sample the audio input of the user and could generate a response to the audio input. Because the user has not intentionally provided the audio feature (e.g., by speaking a wakeword) and does not intend to interact with the device, the response of the device could surprise or frustrate the user.

To address these concerns, in some embodiments, a machine learning model can be trained based on one or more positive audio samples of a user, each of the one or more positive audio samples including the audio feature, and one or more negative audio samples of the user that share an acoustic similarity with one or more of the one or more positive audio samples. For example, the acoustic similarity can be a difference between a waveform of the one or more positive audio samples and a waveform of the one or more negative audio samples that is within a waveform difference threshold, or a difference between a phonetic sequence of the one or more positive audio samples and a phonetic sequence of the one or more negative audio samples that is within a phonetic sequence difference threshold, such as an edit distance.

In some embodiments, the device can generate a user-specific perturbation that can be applied to a representation of an audio sample of the user. For example, a device could ask the user to provide one or more positive audio samples of the audio feature (e.g., one or more instances of speaking a wakeword), and to provide one or more negative audios samples that share an acoustic similarity with at least one of the one or more positive audio samples (e.g., one or more instances of speaking a word that is different than a wakeword, but that is acoustically similar to the wakeword due to the accent, regional dialect, a manner of speech of the user, or the like). A user-specific perturbation generator model 146 could be trained to generate a user-specific perturbation that, when applied to (e.g., combined with) a representation of an audio sample of the user, produces a perturbed representation. An audio feature detection model 144 can process the perturbed representation of the audio sample to recognize the audio feature and to refrain from recognizing the audio feature in negative audio samples not including the audio feature. A device can use an output of the audio feature detection model 144 to determine whether to respond to the audio sample (e.g., by generating and providing a response to an audio sample that is determined to include the audio feature) or to refrain from responding to the audio sample (e.g., by refraining from responding to an audio sample that is determined not to include the audio feature). Accordingly, the device can more accurately and selectively detect and respond to the inclusion of the audio feature in an audio sample of a user, taking into account an accent, regional dialect, manner of speech of the user, or the like, in accordance with some embodiments.

It is to be appreciated that FIG. 1 shows only one example of an embodiment, and that other embodiments can vary without departing from the scope of embodiments. For example, the computing device 100 of FIG. 1 includes a memory 116 storing an audio feature detection model 144 and a user-specific perturbation generator model 146. As a first example variation, other embodiments can implement all or part of the audio feature detection model 144 in a first memory and the user-specific perturbation generator model 146 in a second memory. As a second example variation, other embodiments can implement all or part of the audio feature detection model 144, and/or all or part of the user-specific perturbation generator model 146 as discrete circuitry, such as a neural processing circuit. As a third example variation, other embodiments can include one machine learning model that combines the audio feature detection model 144 and the user-specific perturbation generator model 146. As a fourth example variation, all or part of the user-specific perturbation generator model 146 and/or audio feature detection model 144 can be implemented in a different device, such as the one or more remote devices 140.

Figure 2A:
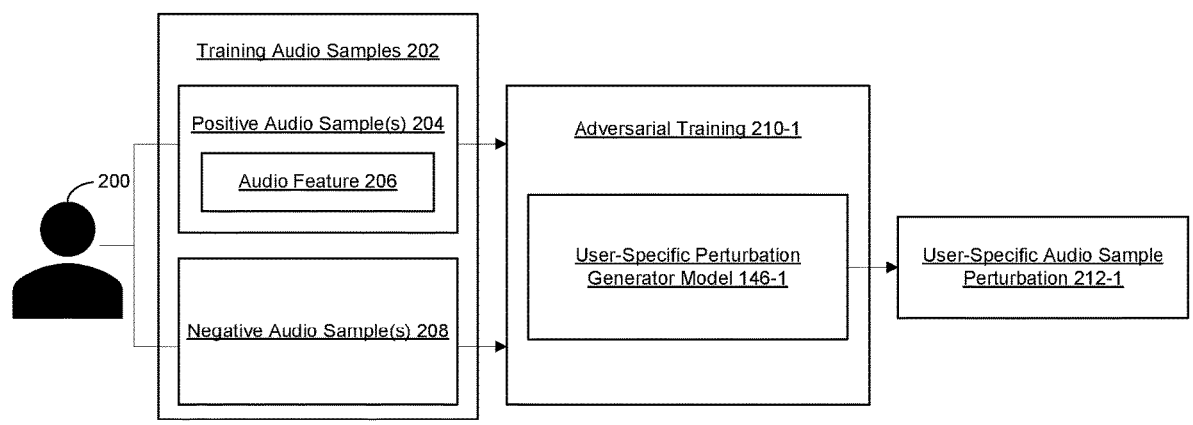
FIG. 2A is a block diagram of a first example of adversarial training of a user-specific perturbation generator model to generate user-specific audio sample perturbations, according to one or more aspects of the various embodiments.

FIG. 2A is a block diagram of a first adversarial training 210-1 of a user-specific perturbation generator model 146-1 to generate user-specific audio sample perturbations, according to one or more aspects of the various embodiments. In some embodiments, user-specific perturbation generator model 146-1 can be used as user-specific perturbation generator model 146 as shown in FIG. 1. User-specific audio sample perturbations 212-1 can be processed by an audio feature detection model 144-1, which can be, for example, an audio feature detection model 144-1 included in the computing device 100 of FIG. 1.

As shown in FIG. 2A, a user 200 provides a set of training audio samples 202, including one or more positive audio samples 204, each of the one or more positive audio samples 204 including an audio feature 206. For example, the audio feature 206 can be an instance of a wakeword, an instance of a word or phrase indicating a query or command directed to a computing device 100, or the like. The user 200 also provides one or more negative audio samples 208 not including the audio feature, but that share an acoustic similarity with one or more of the one or more positive audio samples 204. For example, each of the one or more negative audio samples 208 can be or can include a word or phrase that is different than a wakeword, but that is acoustically similar to the wakeword (e.g., where differences between waveforms of the one or more positive audio samples and waveforms of the one or more negative audio samples are within a waveform difference threshold).

In some embodiments, the training audio samples 202 can be selected for the user 200 during enrollment, for example, a selected wakeword and one or more words that are different than, but acoustically similar to, the wakeword. In some embodiments, the selection can be based on one of more features of the user 200, such as a demographic feature of the user 200. As a first such example, the training audio samples 202 can be selected based on a determination that individuals with demographic features similar to the user 200 often speak a wakeword in an accent, regional dialect, manner of speech, or the like, that can cause the wakeword to be difficult to detect. As a second such example, the training audio samples 202 can be selected based on a determination that individuals with demographic features similar to the user 200 often speak a particular word that is different than the wakeword, but that can sound like the wakeword due to an accent, regional dialect, manner of speech, or the like. In some embodiments, the acoustic similarity between the one or more positive audio samples 204 and the one or more negative audio sample 208 can be or can include a frequency spectrum difference between a frequency spectrum of a first positive audio sample of the one or more positive audio samples 204 and a frequency spectrum of a first negative audio sample of the one or more negative audio samples 208, the frequency spectrum difference being within a frequency spectrum difference threshold. Alternatively or additionally, in some embodiments, the acoustic similarity between the one or more positive audio samples 204 and the one or more negative audio sample 208 can be or can include a phoneme sequence difference between a phoneme sequence of a first positive audio sample of the one or more positive audio samples 204 and a phoneme sequence of a first negative audio sample of the one or more negative audio samples 208, the phoneme sequence difference being within a phoneme sequence difference threshold.

In some embodiments, the training audio samples 202 to be provided by the user can be selected in advance. As a first example, a developer can determine a set of words or phrases that are acoustically similar to a wakeword (e.g., based on evaluating audio samples that resulted in false positives for the wakeword, either among users general or among a subset of users with similar demographic features). As a second example, a linguist can identify a set of words or phrases that are acoustically similar to a wakeword (e.g., words or phrases with phoneme sequences that are likely to be similar to a phoneme sequence of the wakeword, either in general or when the words or phrases are spoken by a subset of users with similar demographic features). In these and other examples, the memory 116 or storage 114 of a computing device 100 can store a set of predetermined training audio samples 202 that is to be used to enroll users 200 who match a demographic profile (e.g., users 200 who are located in a particular geographic area and/or who speak a particular language). The computing device 100 can select each of the one or more negative audio samples 208 from a stored set of one or more negative audio samples 208 sharing an acoustic similarity with at least one of the one or more positive audio samples 204 that include the audio feature 206.

Alternatively or additionally, in some embodiments, the training audio samples 202 can be selected at the time of enrollment. As a first example, a computing device 100 can perform an evaluation of audio samples of the user 200 to determine an accent, regional dialect, manner of speech, or the like of the user 200, and can select a training audio samples 202 based on this determination. The computing device 100 can select each of the one or more negative audio samples 208 based on the one or more positive audio samples 204 received from the user 200. As a second example, the user 200 can be asked to choose and speak some words or phrases that are acoustically similar to the wakeword when spoken by the user 200 (e.g., words or phrases for which the user 200 has encountered false positives and/or negatives while interacting with an intelligent voice assistant device).

In some embodiments, in order to receive the training audio samples 202 from the user 200, a computing device 100 can request the user 200 to provide the one or more negative audio samples 208. For example, the computing device 100 can provide voice prompts that ask the user 200 to speak each of the one or more positive audio samples 204 and each of the one or more negative audio samples 208. Alternatively or additionally, the computing device 100 can display written instructions that ask the user 200 to speak each of the one or more positive audio samples 204 and each of the one or more negative audio samples 208. Each of the one or more negative audio samples 208 can be a verbal expression of the user 200 that shares an acoustic similarity with at least one of the one or more positive audio samples 204 based on an accent of the user, a dialect of the user, a manner of speech of the user, or the like. The user 200 can choose the one or more positive audio samples 204 and the one or more negative audio samples 208. The user can indicate which audio samples of the training audio samples 202 include the audio feature 206 and which audio samples of the training audio samples 202 do not include the audio feature 206.

Based on the training audio samples 202, an adversarial training 210-1 can be performed to train a user-specific perturbation generator model 146-1 to generate a user-specific audio sample perturbation 212-1. For example, due to an accent, dialect, manner of speech of the user 200, or the like, the one or more positive audio samples 204 and the one or more negative audio samples 208 can have a first sub-sample that is acoustically similar, such as a first part of a wakeword, wherein corresponding waveforms of the first sub-samples of the one or more positive audio samples 204 and the one or more negative audio samples 208 are similar. Further, due to the accent, dialect, manner of speech of the user 200, or the like, the one or more positive audio samples 204 and the one or more negative audio samples 208 can have a second sub-sample that is acoustically distinct, such as a second part of a wakeword, wherein corresponding waveforms of the second sub-samples of the one or more positive audio samples 204 and the one or more negative audio samples 208 are distinct.

As a first example, during the adversarial training 210-1, the user-specific perturbation generator model 146-1 can generate the user-specific audio sample perturbation 212-1, such as a waveform. The waveforms of the one or more positive audio samples 204 and the one or more negative audio samples 208 can be perturbed by the user-specific audio sample perturbation 212-1, for example, by waveform addition, subtraction, multiplication, division, or averaging. For example, the user-specific audio sample perturbation 212-1 can be a waveform that increases or passes sub-samples of the waveforms of the one or more positive audio samples 204 that are similar to the corresponding subsamples of the waveform of a typical user speaking the wakeword, and/or a waveform that that decreases or masks sub-samples of the waveforms of the one or more positive audio samples 204 that are dissimilar to the corresponding sub-samples of the waveform of a typical user speaking the wakeword, wherein the similarity and dissimilarity are based on an accent, dialect, manner of speech, or the like of the user 200. As a second example, the user-specific audio sample perturbation 212-1 can be a waveform that reduces or masks sub-samples of the waveforms of the one or more positive audio samples 204 that are similar to the corresponding sub-samples of the one or more negative audio samples 208 based on an accent, dialect, manner of speech, or the like of the user 200, and/or a waveform that that increases or passes sub-samples of the waveforms of the one or more positive audio samples 204 that are dissimilar to the corresponding sub-samples of the one or more negative audio samples 208, wherein the similarity and dissimilarity are based on an accent, dialect, manner of speech, or the like of the user 200. The training audio samples 202, having been perturbed by the user-specific audio sample perturbation 212-1, can be processed by an audio feature detection model 144-1 to determine whether the perturbed one or more positive audio samples 204 are recognized as including the audio feature 206 and whether the perturbed one or more negative audio samples 208 are not recognized as including the audio feature 206.

Based on these determinations, the adversarial training 210-1 can adjust the user-specific perturbation generator model 146-1 (e.g., adjusting respective frequencies and/or samples of a waveform, such as randomly and/or according to a gradient, and/or adjusting the user-specific perturbation generator model 146-1 to choose among a set of candidate user-specific audio sample perturbations 212-1, such as retaining one or more candidates with high performance and discarding one or more candidates with poor performance). As a first example, the adversarial training 210-1 can include adjusting the user-specific perturbation generator model 146-1 to generate user-specific audio sample perturbations 212-1 that increase an acoustic similarity between a predetermined audio sample that includes the audio feature 206 and perturbed positive audio samples of the one or more positive audio samples 204. As a second example, the adversarial training 210-1 can include adjusting the user-specific perturbation generator model 146-1 to generate user-specific audio sample perturbations 212-1 that decrease an acoustic similarity between perturbed positive audio samples of the one or more positive audio samples 204 and perturbed negative audio samples of the one or more negative audio samples 208. By such adjusting of the user-specific perturbation generator model 146-1, the adversarial training 210-1 can increase true positive determinations that the perturbed one or more positive audio samples 204 include the audio feature 206; decease false negative determinations that the perturbed one or more positive audio samples 204 do not include the audio feature 206; increase true negative determinations that the perturbed one or more negative audio samples 208 do not include the audio feature 206; and/or decease false positive determinations that the perturbed one or more negative audio samples 208 include the audio feature 206.

The adversarial training 210-1 of the user-specific perturbation generator model 146-1 can be performed (e.g., in an iterative manner, such as one or more epochs) while monitoring a training metric that indicates progress of the adversarial training 210-1. For example, for each epoch of the adversarial training 210-1, a loss metric (e.g., a sum of classification errors of the perturbed one or more positive audio samples 204 and perturbed one or more negative audio samples 208, or a mean squared error calculated between a classification confidence of the perturbed internal representations of each of the training audio samples 202 and the corresponding label) can be monitored as an indicator of the progress of the adversarial training 210-1 of the user-specific perturbation generator model 146-1. In some embodiments, a similar loss metric can be used for the one or more positive audio samples 204 and the one or more negative audio samples 208. In some embodiments, different loss metrics can be used for the one or more positive audio samples 204 and the one or more negative audio samples 208 (e.g., if false positives are perceived to be common or more frustrating to the user 200 than false negatives). Completion of the adversarial training 210-1 of the user-specific perturbation generator model 146-1 can be determined based on the loss metric (e.g., a determination that the loss metric is within a loss metric threshold, or that further training of the loss metric is unlikely to improve the performance of the user-specific perturbation generator model 146-1 on an evaluation set of the training audio samples 202). The resulting user-specific perturbation generator model 146-1 can produce user-specific audio sample perturbations 212-1 that, when used to perturb an audio sample of the user 200, increase a likelihood that an audio feature detection model 144-1 correctly determines an inclusion or absence of the audio feature 206 in a perturbed audio sample.

Figure 2B:
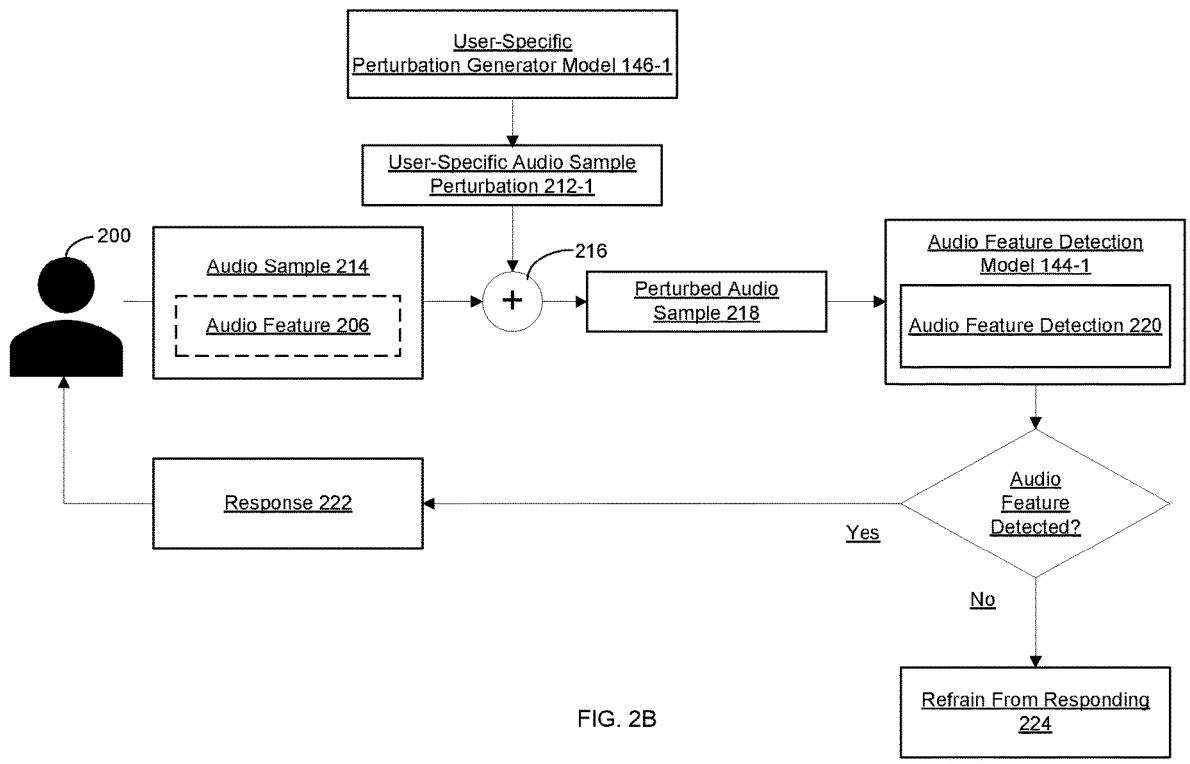
FIG. 2B is a block diagram of a first example of an audio feature detection model that processes a representation of an audio sample that has been perturbed by a user-specific audio sample perturbation generated by a user-specific perturbation generator model, according to one or more aspects of the various embodiments.

FIG. 2B is a block diagram of a first example of an audio feature detection model 144-1 that processes a representation of an audio sample 214 that has been perturbed by a user-specific audio sample perturbation 212-1 generated by a user-specific perturbation generator model 146-1, according to one or more aspects of the various embodiments. The audio feature detection model 144-1 can be, for example, the audio feature detection model 144 included in the computing device 100 of FIG. 1. The user-specific perturbation generator model 146-1 can be, for example, the user-specific perturbation generator model 146 included in the computing device 100 of FIG. 1 and can be generated through the adversarial training 210-1 shown in FIG. 2A.

In FIG. 2B, a user 200 provides an audio sample 214, such as an expression that is detected and sampled by a microphone 134 of computing device 100. In order to determine whether the audio sample 214 includes an audio feature 206, such as a wakeword, the audio sample 214 can be perturbed 216 by a user-specific audio sample perturbation 212-1 generated by the user-specific perturbation generator model 146-1. In some embodiments, the user-specific audio sample perturbation 212-1 can be an output of the user-specific perturbation generator model 146-1 to be applied to any audio sample 214, such as a "frozen" perturbation. In some embodiments, the user-specific perturbation generator model 146-1 can generate a user-specific audio sample perturbation 212-1 based on the audio sample 214, for example, a user-specific audio sample perturbation 212-1 that is based on a feature of the audio sample 214 such as magnitude, duration, frequency distribution, or the like. The perturbing 216 can be, for example, an arithmetic operation applied to the audio sample 214 and the user-specific audio sample perturbation 212-1, such as addition, subtraction, multiplication, division, averaging, filtering, or the like. The perturbing 216 can be, for example, a logical operation applied to the audio sample 214 and the user-specific audio sample perturbation 212-1, such as logical AND and OR operations applied to the audio sample 214 and the user-specific audio sample perturbation 212-1 represented as a bitmask that masks or passes each sub-sample of the audio sample 214.

The perturbed audio sample 218 can be processed by an audio feature detection model 144-1 to perform audio feature detection 220 in order to determine whether the perturbed audio sample 218 includes the audio feature 206. The audio feature detection model 144-1 can be, for example, a machine learning model that has been trained to recognize the audio feature 206 in audio samples 214, and that can similarly be applied to the perturbed audio sample 218. The audio feature detection model 144-1 can include one or more machine learning models of a variety of machine learning model types, such as a recurrent neural network (RNN) or a transformer-based autoencoder. Further, the audio feature detection model 144-1 can perform audio feature detection 220 using many audio feature detection techniques. As a first example, audio feature detection 220 can include comparing a waveform of the perturbed audio sample 218 with a waveform of the audio feature 206 and determining whether or not the perturbed audio sample 218 includes the audio feature 206 based on a difference between the waveforms being within a waveform difference threshold. As a second example, audio feature detection 220 can include determining a representation of the perturbed audio sample 218 as a sequence of phonemes, comparing the sequence of phonemes of the perturbed audio sample 218 with a sequence of phonemes of the audio feature 206, and determining whether or not the perturbed audio sample 218 includes the audio feature 206 based on a difference between the phonemes being within a phoneme difference threshold, such as an edit distance. In other embodiments, any of a variety of other machine learning models and ensembles thereof, implementing a variety of techniques for the audio feature detection 220 and combinations thereof, can be included in the audio feature detection model 144-1.

The computing device 100 can respond to the audio sample 214 based on determining whether the perturbed audio sample 218 includes the audio feature 206. For example, if the audio feature detection model 144-1 determines that the perturbed audio sample 218 includes the audio feature 206, the computing device 100 can generate a response 222 and present the response 222 to the user 200. The response 222 can be, for example, an acknowledgment of a wakeword to indicate that the computing device 100 is active and ready to receive further input; an acknowledgment of an action of the computing device 100 taken in response to an audio feature 206 that is or that includes a command; and/or an answer to the audio feature 206 that is or that includes a query. Further, if the audio feature detection model 144-1 determines that the perturbed audio sample 218 does not include the audio feature 206, the computing device 100 can refrain 224 from providing a response 222, such as by disregarding the audio sample 214 and/or deleting the audio sample 214 from memory 116 or storage 114. By applying the audio feature detection model 144-1 to the perturbed audio sample 218 based on perturbing the audio sample 214 with the user-specific audio sample perturbation 212-1, rather than to the unperturbed audio sample 214, an embodiment configured as shown in FIG. 2B can more accurately respond to the audio sample 214 with reduced incidence of false positives and/or false negatives.

Figure 3A:
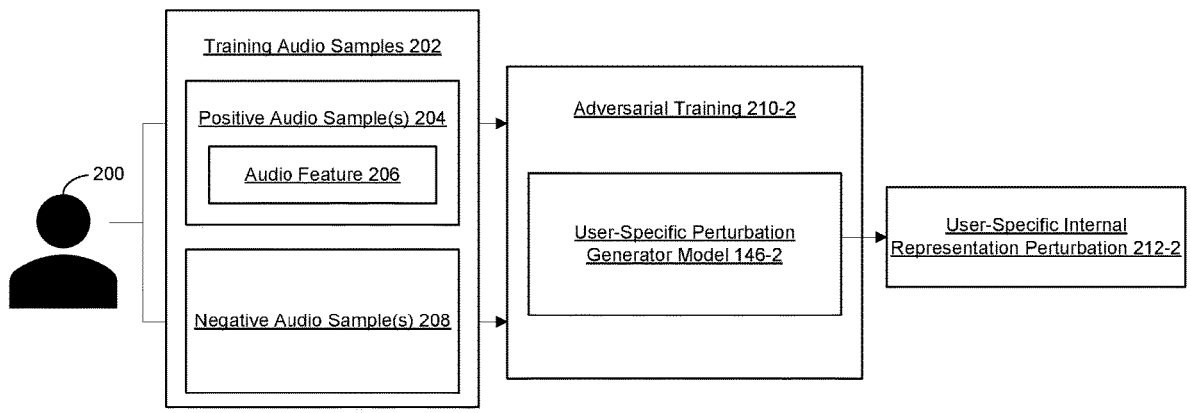
FIG. 3A is a block diagram of a second example of adversarial training of a user-specific perturbation generator model to generate user-specific internal representation perturbations, according to one or more aspects of the various embodiments.

FIG. 3A is a block diagram of a second example of adversarial training 210-2 of a user-specific perturbation generator model 146-2 to generate user-specific internal representation perturbations 212-2, according to one or more aspects of the various embodiments. The user-specific perturbation generator model 146-2 of FIG. 3B can be, for example, the user-specific perturbation generator model 146 as shown in FIG. 1. The user-specific internal representation perturbations 212-2 can be processed by an audio feature detection model 144-2, which can be, for example, an audio feature detection model 144-2 included in the computing device 100 of FIG. 1.

Similar to FIG. 2A, a user 200 can provide a set of training audio samples 202, including one or more positive audio samples 204, each of the one or more positive audio samples including an audio feature 206, and one or more negative audio samples 208, each of the one or more negative audio samples 208 not including the audio feature 206. In some embodiments, in order to receive the training audio samples 202 from the user 200, a computing device 100 can request the user 200 to provide the one or more negative audio samples 208. For example, the computing device 100 can provide voice prompts that ask the user 200 to speak each of the one or more positive audio samples 204 and each of the one or more negative audio samples 208. Alternatively or additionally, the computing device 100 can display written instructions that ask the user 200 to speak each of the one or more positive audio samples 204 and each of the one or more negative audio samples 208. Each of the one or more negative audio samples 208 can be a verbal expression of the user 200 that shares an acoustic similarity with at least one of the one or more positive audio samples 204 based on an accent of the user, a dialect of the user, a manner of speech of the user, or the like. The user 200 can choose the one or more positive audio samples 204 and the one or more negative audio samples 208. The user can indicate which audio samples of the training audio samples 202 are positive audio samples 204 including the audio feature 206 and which audio samples of the training audio samples 202 are negative audio samples 208 not including the audio feature 206.

FIG. 3A shows an adversarial training 210-2 based on the training audio samples 202 to train a user-specific perturbation generator model 146-2 to generate a user-specific internal representation perturbation 212-2. Unlike FIG. 2A, the user-specific perturbation generator model 146-2 in FIG. 3A is trained to generate user-specific internal representation perturbations 212-2 of internal representations of audio samples of the user 200. For example, each of the training audio samples 202 can be partially processed by an audio feature detection model 144-2 to generate an internal representation, such as a feature vector. As one such example, the partial processing can include converting each of the training audio samples 202 to a phoneme sequence, and the phoneme sequences of the one or more positive audio samples 204 can be compared with the corresponding phoneme sequences of the one or more negative audio samples 208. The adversarial training 210-2 of the user-specific perturbation generator model 210 can involve generating user-specific internal representation perturbations 212-2 of the internal representations of the training audio samples 202, such as modifications of the phoneme sequences.

In some embodiments, the user-specific internal representation perturbation 212-2 can be a set of weights by which each phoneme or phoneme sub-sequence of an audio sample 214 is evaluated. For example, the user-specific internal representation perturbation 212-2 can indicate weights that are proportional to a similarity between individual phonemes or phoneme groups of the one or more positive audio samples 204 of the user 200 and corresponding phonemes or phoneme groups of the audio feature 206. That is, the user-specific internal representation perturbation 212-2 can indicate large weights for phonemes or phoneme sub-sequences of a wakeword when spoken by the user 200 that are similar to an established phonemes or phoneme sub-sequences of a typical spoken instance of the wakeword, and/or small weights for phonemes or phoneme sub-sequences of the wakeword when spoken by the user 200 that are dissimilar to an established phonemes or phoneme sub-sequences of a typical spoken instance of the wakeword. As a second example, the user-specific internal representation perturbation 212-2 can indicate weights that are inversely proportional to a similarity between individual phonemes or phoneme groups of the one or more positive audio samples 204 of the user 200 and corresponding phonemes or phoneme groups of the one or more negative audio samples 208 of the user 200. That is, the user-specific internal representation perturbation 212-2 can indicate small weights for phonemes or phoneme sub-sequences of a wakeword when spoken by the user 200 that are similar to corresponding phonemes or phoneme sub-sequences of words that are different than, but acoustically similar to, the wakeword when spoken by the user 200, and/or large weights for phonemes or phoneme sub-sequences of the wakeword when spoken by the user 200 that are dissimilar to corresponding phonemes or phoneme sub-sequences of words that are different than, but acoustically similar to, the wakeword when spoken by the user 200. In some embodiments, representations other than phoneme-based representations of the audio samples that are compatible with various other audio feature detection models can be generated and perturbed, based on a variety of machine learning models of the audio feature detection model 144-2 and ensembles thereof, implementing a variety of techniques for the audio feature detection 220. As an alternative to weights, the user-specific internal representation perturbation 212-2 can be a bitmask that passes phonemes or phoneme sequences of the one or more positive audio samples 204 that are similar to corresponding phonemes or phoneme sequences of the audio feature 206 and/or that are dissimilar to corresponding phonemes or phoneme sequences of the one or more negative audio samples 208, and that masks phonemes or phoneme sequences of the one or more positive audio samples 204 that are dissimilar to corresponding phonemes or phoneme sequences of the audio feature 206 and/or that are similar to corresponding phonemes or phoneme sequences of the one or more negative audio samples 208.

Based on these determinations, the adversarial training 210-2 can adjust the user-specific perturbation generator model 146-2 (e.g., adjusting the weights, bitmasks, or the like applied by the user-specific perturbation generator model 146-2 for respective phonemes or phoneme sub-sequences, and/or adjusting the user-specific perturbation generator model 146-2 to choose among a set of candidate user-specific internal representation perturbations 212-2, such as retaining one or more candidates with high performance and discarding one or more candidates with poor performance). As a first example, the adversarial training 210-2 can include adjusting the user-specific perturbation generator model 146-2 to generate user-specific internal representation perturbations 212-2 that increase a similarity between a perturbed internal representation 306 of a predetermined audio sample that includes the audio feature and perturbed internal representations 306 of the one or more positive audio samples 204. As a second example, the adversarial training 210-2 can include adjusting the user-specific perturbation generator model 146-2 to generate user-specific internal representation perturbations 212-2 that decrease a similarity between perturbed internal representations 306 of the one or more positive audio samples 204 and perturbed internal representations 306 of the perturbed one or more negative audio samples 208. By such adjusting of the user-specific perturbation generator model 146-2, the adversarial training 210-2 can increase true positive determinations that perturbed internal representations of the one or more positive audio samples 204 include the audio feature 206; decease false negative determinations that the perturbed internal representations of the one or more positive audio samples 204 do not include the audio feature 206; increase true negative determinations that the perturbed internal representations of the one or more negative audio samples 208 do not include the audio feature 206; and/or decease false positive determinations that the perturbed internal representations of the one or more negative audio samples 208 include the audio feature 206.

Similar to FIG. 2A, the adversarial training 210-2 of the user-specific perturbation generator model 146-2 as shown in FIG. 3A can be performed (e.g., in an iterative manner, such as over one or more training epochs) while monitoring a training metric that indicates progress of the adversarial training 210-2. For example, for each epoch of the adversarial training 210-2, a loss metric (e.g., a sum of classification errors of the perturbed internal representations 306 of the one or more positive audio samples 204 and the perturbed internal representations 306 of the one or more negative audio samples 208, or a mean squared error calculated between a classification confidence of the perturbed internal representations 306 of each of the training audio samples 202 and the corresponding labels) can be monitored as an indicator of the progress of the adversarial training 210-2 of the user-specific perturbation generator model 146-2. In some embodiments, a similar loss metric can be used for the one or more positive audio samples 204 and the one or more negative audio samples 208. In some embodiments, different loss metrics can be used for the one or more positive audio samples 204 and the one or more negative audio samples 208 (e.g., if false positives are perceived to be common or more frustrating to the user 200 than false negatives). Completion of the adversarial training 210-2 of the user-specific perturbation generator model 146 can be determined based on the loss metric (e.g., a determination that the loss metric is within a loss metric threshold, or that further training of the loss metric is unlikely to improve the performance of the user-specific perturbation generator model 146-2 on an evaluation set of training audio samples 202). The resulting user-specific perturbation generator model 146-2 can produce user-specific internal representation perturbations 212-2 as internal representation perturbations that, when used to perturb an internal representation of an audio sample 214 of the user 200, increase a likelihood that an audio feature detection model 144-2 correctly determines an inclusion or absence of the audio feature 206 in the perturbed internal representation of the audio sample 214.

Figure 3B:
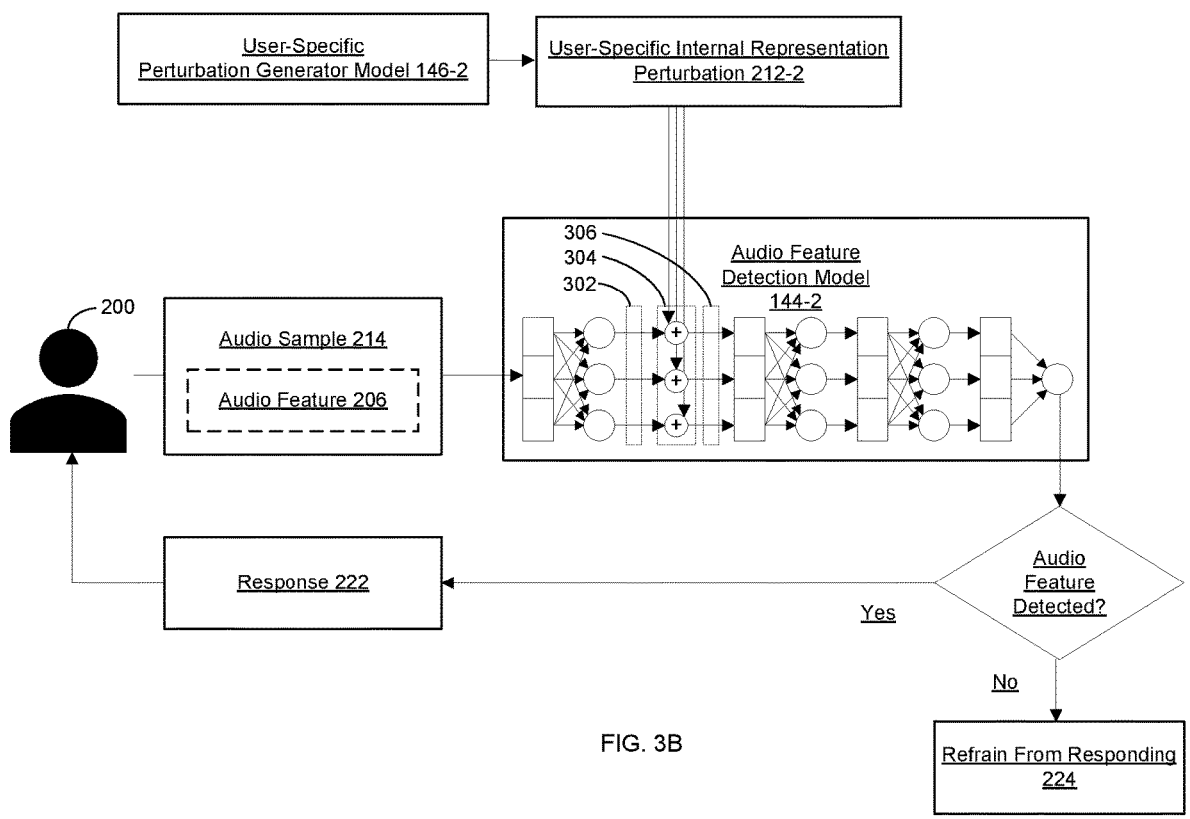
FIG. 3B is a block diagram of a second example of an audio feature detection model that processes an internal representation of an audio sample that has been perturbed by a user-specific internal representation perturbation generated by a user-specific perturbation generator model, according to one or more aspects of the various embodiments.

FIG. 3B is a block diagram of a second example of an audio feature detection model 144-2 that processes a perturbed internal representation 306 of an audio sample 214 that has been perturbed by a user-specific internal representation perturbation 212-2 generated by a user-specific perturbation generator model 146-2, according to one or more aspects of the various embodiments. The audio feature detection model 144-2 can be, for example, an audio feature detection model 144 included in the computing device 100 of FIG. 1. The user-specific perturbation generator model 146-2 can be, for example, a user-specific perturbation generator model 146 included in the computing device 100 of FIG. 1 and can be generated through the adversarial training 210-2 shown in FIG. 3A.

Similar to FIG. 2B, FIG. 3B shows a user 200 providing an audio sample 214 that may or may not include an audio feature 206. Also, similar to FIG. 2B, FIG. 3B shows a perturbation of the audio sample 214 with a user-specific audio internal representation perturbation 212-2 generated by a user-specific perturbation generator model 146-2 for processing by an audio feature detection model 144-2. Unlike FIG. 2B, the user-specific internal representation perturbation 212-2 is used to perturb an internal representation 302 of the audio sample 214 within the audio feature detection model 144-2. For example, the audio sample 214 can be provided as input to an audio feature detection model 144-2, such as a neural network (e.g., a recurrent neural network that processes a sequence of sub-samples of the audio sample 214), wherein the audio feature detection model 144-2 generates an internal representation of the audio sample 214 (e.g., a feature vector). The internal representation 302 can be, for example, the output of a layer of the neural network that indicates a phoneme or phoneme sequence of a sub-sample of the audio sample 214. In some embodiments, the internal representation 302 includes a state of the audio feature detection model 144-2, such as a result of processing preceding sub-samples of the audio sample 214, as in a recurrent neural network.

As shown in FIG. 3B, the user-specific internal representation perturbation 212-2 can perturb 304 the internal representation 302 of the audio sample 214, for example, by adding, subtracting, multiplying, or dividing the feature vector of the internal representation 302 with the weights indicated by the user-specific internal representation perturbation 212-2, and/or by passing or masking phonemes of the feature vector of the internal representation 302 based on a bitmask indicated by the user-specific internal representation perturbation 212-2, to produce a perturbed internal representation 306. The audio feature detection model 144-2 can continue to process the perturbed internal representation 306 to produce a determination of whether the audio sample 214 includes the audio feature 206. Similar to the example of FIG. 2B, the determination by the audio feature detection model 144-2 of whether the audio sample 214 (as perturbed by the user-specific internal representation perturbation 212-2) includes the audio feature 206. For example, based on the audio feature detection model 144-2 determining that the perturbed internal representation 306 is an internal representation that is consistent with an internal representation of the audio sample 214 the includes the audio feature 206. Similar includes the audio feature 206, a computing device 100 can generate and present a response 222 to the audio sample 214; and based on the audio feature detection model 144-2 determining that the audio sample 214 does not include the audio feature 206, a computing device 100 can refrain 224 from presenting a response 222 to the audio sample 214. By applying the audio feature detection model 144-2 to the perturbed internal representation 306 of the audio sample 214 based on the user-specific internal representation perturbation 212-2, rather than to the unperturbed internal representation 302, an embodiment configured as shown in FIG. 3B can more accurately respond to the audio sample 214 with reduced incidence of false positives and/or false negatives.

In some embodiments, one computing devices 100 may be configured to use the techniques presented herein to interact with a user 200. For example, and as shown in FIG. 1, a computing device 100 can include an audio processing application 142 including both an audio feature detection model 144 and a user-specific perturbation generator model 146. During enrollment, the computing device 100 can receive one or more positive audio samples 204 of the user 200 and one or more negative audio samples 208 and can adversarially train the user-specific perturbation generator model 146 to generate user-specific perturbations 212. After the adversarial training, based on receiving an audio sample 214 from the user 200 that may or may not include the audio feature 206, the computing device 100 can perturb a representation of the audio sample 214 with a user-specific perturbation 212 to generate a perturbed representation, process the perturbed representation of the audio sample 214 by an audio feature detection model to determine whether the audio sample 124 includes the audio feature 206, and determine a response to the audio sample 214 based on the determining (e.g., by providing a response 222 based on determining that the audio sample 124 includes the audio feature 206, and refraining 224 from providing a response based on determining that the audio sample 124 does not include the audio feature 206). In some such embodiments, the computing device 100 can adversarially train the user-specific perturbation generator model 146-1 of FIG. 2A and FIG. 2B to generate audio sample perturbations and can perturb 216 the audio sample 214 to generate a perturbed audio sample 218 that is processed by the audio feature detection model 144-1 of FIG. 2B. In some such embodiments, the computing device 100 can adversarially train the user-specific perturbation generator model 146-2 of FIG. 3A and FIG. 3B to generate internal representation perturbations and can perturb 304 an internal representation 302 of the audio sample 214 to generate a perturbed internal representation 306 that is processed by the audio feature detection model 144-2 of FIG. 3B.

In some embodiments, two or more computing devices can each implement one or more features of the disclosed techniques in order to enable one of the computing devices 100 to interact with a user 200. As a first such example, a first computing device 100, such as a cloud-based server or service executing on one of remote devices 140, can adversarially train a user-specific perturbation generator model 146, such as the user-specific perturbation generator model 146-1 of FIG. 2A and/or the user-specific perturbation generator model 146-2 of FIG. 3A, and can deploy the user-specific perturbation generator model 146 to a second computing device 100 (e.g., one of remote devices 140). The second computing device 100 can receive and store the user-specific perturbation generator model 146, and based on receiving an audio sample 214 from the user 200 that may or may not include the audio feature 206, the second computing device 100 can perturb a representation of the audio sample 214 with a user-specific perturbation 212, process the perturbed representation of the audio sample 214 by an audio feature detection model to determine whether the audio sample 124 includes the audio feature 206. In some such embodiments, the second computing device 100 can perturb 216 the audio sample 214 with a user-specific audio sample perturbation 212-1 to generate a perturbed audio sample 218 that is processed by the audio feature detection model 144-1 of FIG. 2B. In some such embodiments, the second computing device 100 can perturb 304 an internal representation 302 of the audio sample 214 with a user-specific internal representation perturbation 212-2 to generate a perturbed internal representation 306 that is processed by the audio feature detection model 144-2 of FIG. 3B. Based on the determining, the second computing device 100 can determine a response to the audio sample 214 (e.g., by providing a response 222 based on determining that the audio sample 124 includes the audio feature 206, and/or refraining 224 from providing a response based on determining that the audio sample 124 does not include the audio feature 206).

As a second such example, a first computing device 100, such as a cloud-based server or service executing on one of remote devices 140, can adversarially train a user-specific perturbation generator model 146, such as the user-specific perturbation generator model 146-1 of FIG. 2A, and can deploy a user-specific audio sample perturbation 212-1 generated by the user-specific perturbation generator model 146-1, such as an audio sample perturbation, to a second computing device 100 (e.g., one of remote devices 140). The second computing device 100 can receive and store the user-specific audio sample perturbation 212-1. Based on receiving an audio sample 214 from the user 200 that may or may not include the audio feature 206, the second computing device 100 can perturb a representation of the audio sample 214 with the user-specific audio sample perturbation 212-1 and process the perturbed representation of the audio sample 214-1 by an audio feature detection model to determine whether the audio sample 124 includes the audio feature 206. Based on the determining, the second computing device 100 can determine a response to the audio sample 214 based on the determining (e.g., by providing a response 222 based on determining that the audio sample 124 includes the audio feature 206, and/or refraining 224 from providing a response based on determining that the audio sample 124 does not include the audio feature 206).

As a third such example, a first computing device 100, such as a cloud-based server or service executing on one of remote devices 140, can adversarially train a user-specific perturbation generator model 146, such as the user-specific perturbation generator model 146-1 of FIG. 2A, and can perturb an audio sample 214 received from a second computing device 100. For example, based on receiving an audio sample 214 from the user 200 that may or may not include the audio feature 206, and can send the second computing device 100 can send the audio sample 214 to the first computing device 100. The first computing device 100 can generate and/or retrieve a user-specific audio sample perturbation 212-1, perturb the audio sample 214 with the user-specific audio sample perturbation 212-1, and send the perturbed audio sample 218 back to the second computing device 100 (e.g., one of remote devices 140). The second computing device 100 can perturb 216 the audio sample 214 with the received user-specific audio sample perturbation 212-1 to generate a perturbed audio sample 218. The second computing device 100 can process the perturbed audio sample 214 by an audio feature detection model 144-1 to determine whether the audio sample 124 includes the audio feature 206, and can determine a response to the audio sample 214 based on the determining (e.g., by providing a response 222 based on determining that the audio sample 124 includes the audio feature 206, and refraining 224 from providing a response based on determining that the audio sample 124 does not include the audio feature 206).

As a fourth such example, a first computing device 100, such as a cloud-based server or service executing on one of remote devices 140, can include an audio processing application 142 including both an audio feature detection model 144 and a user-specific perturbation generator model 146, and can process audio samples 214 of a user 200 received by a second computing device 100. For example, based on receiving an audio sample 214 of the user 200, the second computing device 100 can send the audio sample 214 to the first computing device 100. The first computing device 100 can perturb a representation of the audio sample 214 with a user-specific perturbation 212, such as the user-specific audio sample perturbation 212-1 generated by the user-specific perturbation generator model 146-1 of FIG. 2B. The first computing device 100 can process the perturbed representation with an audio feature detection model 144, such as the audio feature detection model 144-1 of FIG. 2B, to determine whether the audio sample 214 includes the audio feature 206. The first computing device 100 can return the determination to the second computing device 100, which can determine a response to the audio sample 214 (e.g., by providing a response 222 based on determining that the audio sample 124 includes the audio feature 206, and/or refraining 224 from providing a response based on determining that the audio sample 124 does not include the audio feature 206). Many such variations fall within the scope of the various embodiments.

Figure 4:
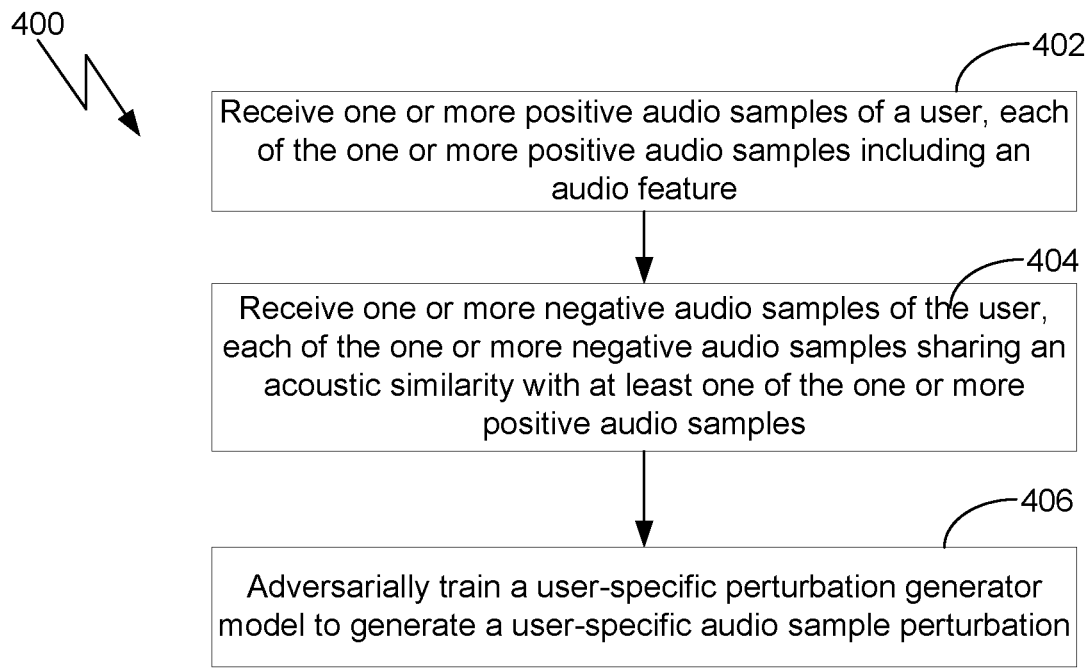
FIG. 4 illustrates a flow diagram of method steps for training a user-specific perturbation generator, according to one or more aspects of the various embodiments.

FIG. 4 illustrates a flow diagram of method steps for training a user-specific perturbation generator for an audio feature detection model, according to one or more aspects of the various embodiments. Although the method steps are described with respect to the systems of FIGS. 1 and 2A, persons skilled in the art will understand that any system configured to perform the method steps, in any order, falls within the scope of the various embodiments.

As shown a method 400 begins at step 402 where a computing device (e.g., computing device 100, remote device 140, and/or the like) receives the one or more positive audio samples 204 of the user 200, each of the one or more positive audio samples 204 include the audio feature 206. For example, the audio processing application 142, such as an audio processing application in an intelligent personal assistant, can ask the user 200 to speak one or more words or phrases that include the audio feature 206, such as different phrases that include a wakeword. The audio processing application 142 can receive the one or more positive audio samples 204 with one or more microphones 134 and store the one or more positive audio samples 204 in the storage 114.

At step 404, the audio processing application 142 receives the one or more negative audio samples 208 of the user 200. Each of the one or more negative audio samples 208 shares an acoustic similarity with at least one of the one or more positive audio samples 204. For example, the audio processing application 142 can ask the user 200 to speak one or more words or phrases that do not include the audio feature 206, but that may sound like the audio feature 206 when spoken by the user 200, due to the accent, dialect, manner of speech, or the like of the user 200. In some embodiments, the audio processing application 142 can determine demographic features of the user 200 and choose a set of negative audio samples that, when spoken by individuals with similar demographic features as the user 200, share an acoustic similarity with the audio feature 206. The set of negative audio samples can be selected by a developer or linguist. The audio processing application 142 can receive the one or more negative audio samples 208 with one or more microphones 134 and store the one or more negative audio samples in the storage 114.

At step 406, the audio processing application 142 adversarially trains the user-specific perturbation generator model 146-1 to generate the user-specific audio sample perturbation 212-1 of the user 200. For example, the audio processing application 142 can train the user-specific perturbation generator model 146-1 to generate the user-specific audio perturbation 212-1 that, when combined with audio samples of the user 200, increase an acoustic similarity and/or decrease an acoustic dissimilarity between positive audio samples of the user and the audio feature 206. In some embodiments, the audio processing application 142 can train the user-specific perturbation generator model 146-1 to generate the user-specific audio sample perturbation 212-1 that, when combined with audio samples of the user 200, decrease an acoustic similarity and/or increase an acoustic dissimilarity between negative audio samples of the user 200 and the audio feature 206.

Figure 5:
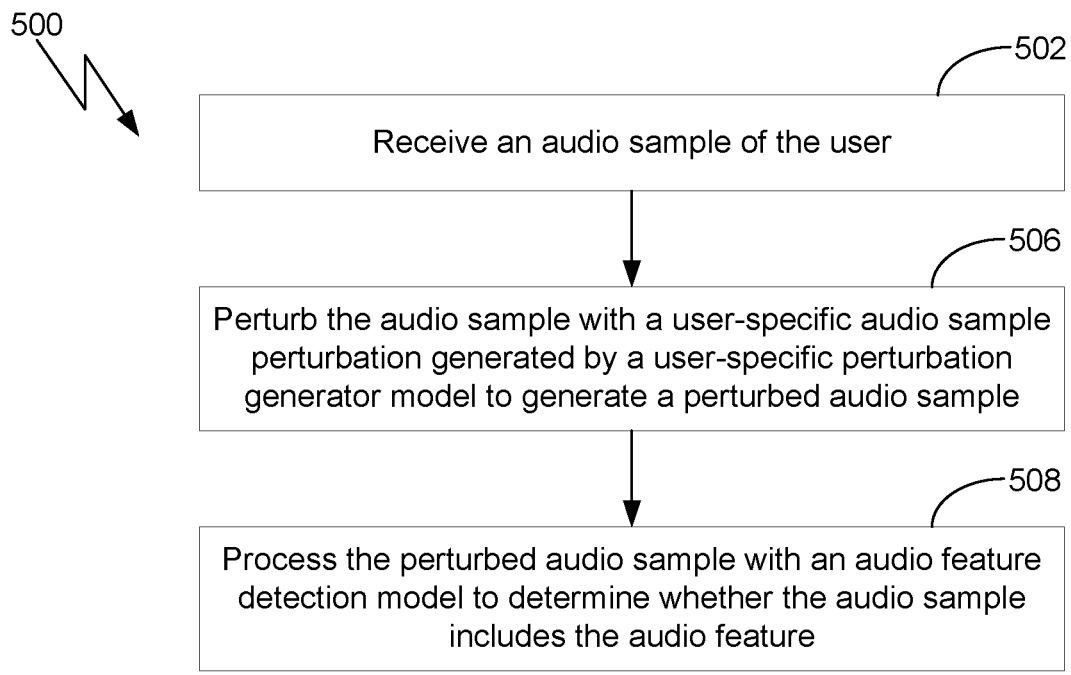
FIG. 5 illustrates a flow diagram of method steps for determining an interaction between a user and a device, according to one or more aspects of the various embodiments.

FIG. 5 illustrates a flow diagram of method steps for determining whether an audio sample of a user includes an audio feature, according to one or more aspects of the various embodiments. Although the method steps are described with respect to the systems of FIGS. 1 and 2B, persons skilled in the art will understand that any system configured to perform the method steps, in any order, falls within the scope of the various embodiments.

As shown a method 500 begins at step 502 where a computing device (e.g., computing device 100, remote device 140, and/or the like) receives the audio sample 214 of the user 200. For example, the audio processing application 142, such as an audio processing application in an intelligent personal assistant, can detect that the user 200 is speaking, receive the audio sample 214 of the speech of the user 200 with one or more microphones 134, and optionally store the audio sample 214 in the storage 114. The audio sample 214 could be a positive audio sample that is or that includes the audio feature 206 (e.g., a wakeword), or could be a negative audio sample that does not include the audio feature 206 but is acoustically similar to the audio feature 206.

At step 506, the audio processing application 142 perturbs the audio sample 214 with the user-specific audio sample perturbation 212-1 generated by the user-specific perturbation generator model 146-1 to generate the perturbed audio sample 218. For example, the user-specific audio sample perturbation 212-1 could be a waveform that, for positive audio samples, increases or passes subsamples of the audio sample 214 that are acoustically similar to the audio feature 206, and that decreases or masks subsamples of the audio sample 214 that are acoustically dissimilar to the audio feature 206. Alternatively or additionally, the user-specific audio perturbation could be a waveform that, for negative audio samples, decreases or masks subsamples of the audio sample 214 that are acoustically similar to the audio feature 206, and that increases or passes subsamples of the audio sample 214 that are acoustically dissimilar to the audio feature 206.

At step 508, the audio processing application 142 processes the perturbed audio sample 218 with the audio feature detection model 144-1 to determine whether the audio sample 214 includes the audio feature 206. For example, the audio feature detection model 144-1 can compare a waveform of the perturbed audio sample 218 and a waveform of the audio feature 206 to determine whether a difference between the perturbed audio sample 218 and the audio feature 206 is within a difference threshold. If so, the audio processing application 142 can generate and present the response 222 to the audio sample 214, such as responding to the audio feature 206 or providing a response to a query or command of the user 200; and if not, the audio processing application 142 can refrain from providing a response 224.

Figure 6:
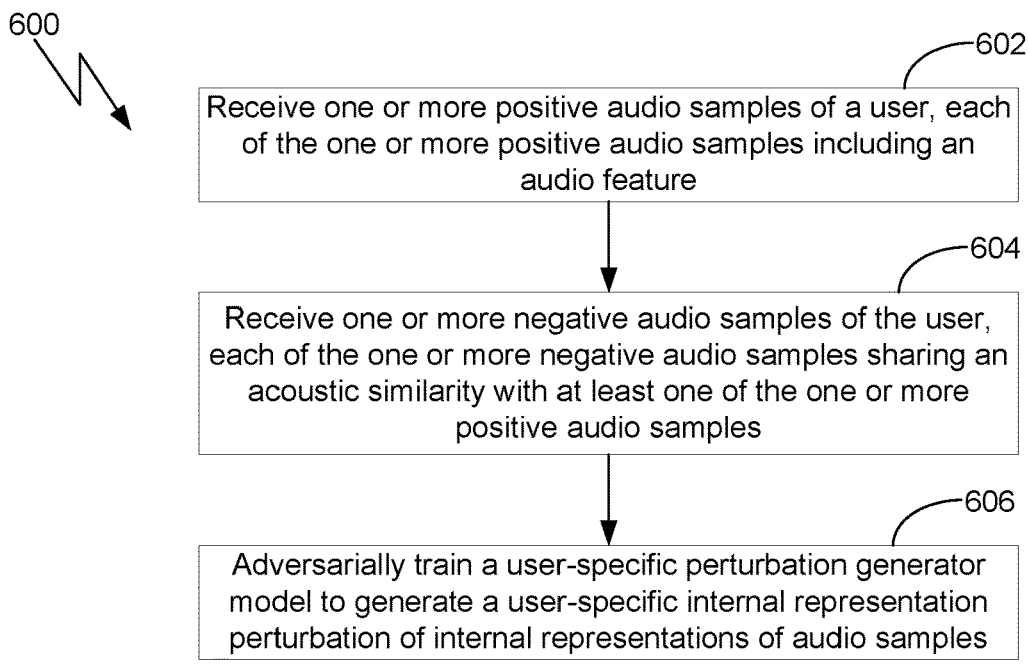
FIG. 6 illustrates a flow diagram of method sets for training a user-specific perturbation generator, according to one or more additional aspects of the various embodiments.

FIG. 6 illustrates a flow diagram of method steps for training a user-specific perturbation generator for an audio feature detection model based on one or more positive audio samples of the user and one or more negative audio samples of the user, according to one or more additional aspects of the various embodiments. Although the method steps are described with respect to the systems of FIGS. 1 and 3A, persons skilled in the art will understand that any system configured to perform the method steps, in any order, falls within the scope of the various embodiments.

As shown a method 600 begins at step 602 where a computing device (e.g., computing device 100, remote device 140, and/or the like) receives the one or more positive audio samples 204 of the user 200. Each of the one or more positive audio samples 204 includes the audio feature 206. For example, the audio processing application 142, such as an audio processing application in an intelligent personal assistant, can ask the user 200 to speak one or more words or phrases that include the audio feature 206, such as different phrases that include a wakeword. the audio processing application 142 can receive the one or more positive audio samples 204 with one or more microphones 134 and store the one or more positive audio samples 204 in the storage 114.

At step 604, the audio processing application 142 receives the one or more negative audio samples 208 of the user 200. Each of the one or more negative audio samples 208 shares a similarity with at least one of the one or more positive audio samples 204. For example, the audio processing application 142 can ask the user 200 to speak one or more words or phrases that do not include the audio feature 206, but that may sound like the audio feature 206 when spoken by the user 200, due to the accent, dialect, manner of speech, or the like of the user 200. In some embodiments, the audio processing application 142 can determine demographic features of the user 200 and choose a set of negative audio samples 208 that, when spoken by individuals with similar demographic features as the user 200, share an acoustic similarity with the audio feature 206. The set of negative audio samples 208 can be selected by a developer or linguist. The audio processing application 142 can receive the one or more negative audio samples 208 with one or more microphones 134 and store the one or more negative audio samples 208 in the storage 114.

At step 606, the audio processing application 142 adversarially trains the user-specific perturbation generator model 146-2 to generate the user-specific internal representation perturbations 212-2 of internal representations of audio samples of the user 200. For example, the audio processing application 142 can train the user-specific perturbation generator model 146-2 to generate the user-specific internal representation perturbation 212-2 that, when combined with feature vectors representing internal representations of the positive audio samples 204 of the user 200 within an audio feature detection model (e.g., audio feature detection model 144-2), increase a similarity and/or decrease a dissimilarity between the feature vectors and a feature vector that is an internal representation of the audio feature 206. In some embodiments, the audio processing application 142 can train the user-specific perturbation generator model 146-2 to generate the user-specific internal representation perturbation 212-2 that, when combined with a feature vector representing internal representations of negative audio samples of the user 200 within the audio feature detection model, decrease a similarity and/or increase a dissimilarity between the internal representations of the negative audio samples 208 and the internal representation of the audio feature 206.

Figure 7:
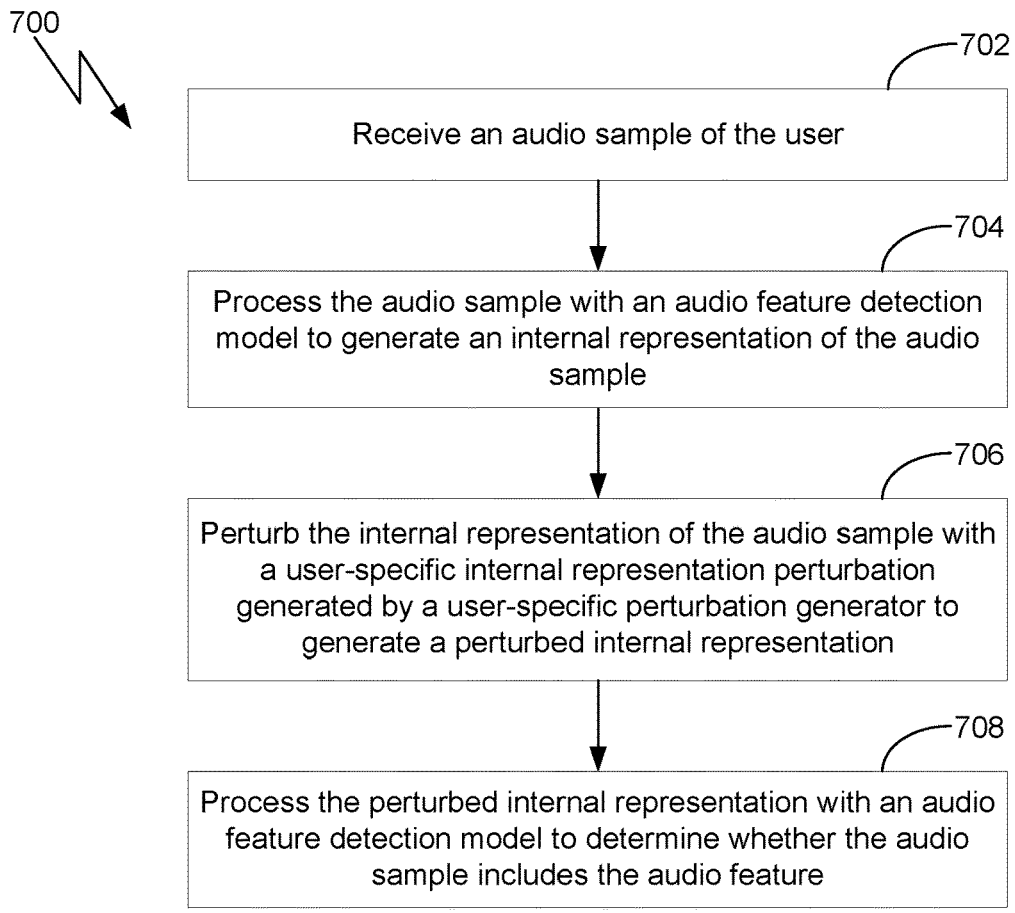
FIG. 7 illustrates a flow diagram of method steps for determining an interaction between a user and a device, according to one or more additional aspects of the various embodiments.

FIG. 7 illustrates a flow diagram of method steps for determining whether an audio sample of a user includes an audio feature, according to one or more additional aspects of the various embodiments. Although the method steps are described with respect to the systems of FIGS. 1 and 3B, persons skilled in the art will understand that any system configured to perform the method steps, in any order, falls within the scope of the various embodiments.

As shown a method 700 begins at step 702 where a computing device (e.g., computing device 100, remote device 140, and/or the like) receives an audio sample of the user. For example, the audio processing application 142, such as an audio processing application in an intelligent personal assistant, can detect that the user 200 is speaking, receive the audio sample 214 of the user 200 with the one or more microphones 134, and optionally store the audio sample 214 in the storage 114. The audio sample 214 could be a positive audio sample that is or that includes the audio feature 206 (e.g., a wakeword), or could be a negative audio sample that does not include the audio feature 206 but is acoustically similar to the audio feature 206.

At step 704, the audio processing application 142 processes the audio sample 214 with the audio feature detection model 144-2 to generate the internal representation 302 of the audio sample 214. For example, the audio sample 214 can be partially processed by a model such as an artificial neural network to generate, as output from a neuron layer, a feature vector of features of the partially-processed audio sample. The features could be, for example, an encoding of a sequence of phonemes that correspond to the audio sample 214.

At step 706, the audio processing application 142 perturbs the internal representation 302 of the audio sample 214 with the user-specific internal representation perturbation 212-2 generated by the user-specific perturbation generator model 146-2 to generate the perturbed internal representation 306. For example, the user-specific internal representation perturbation 306 could be a weighting applied to a feature vector representing a sequence of that, for positive audio samples, increases or passes values of the feature vector of phonemes that are similar to the corresponding phoneme in a phoneme sequence of the audio feature 206, and that decreases or masks values of the feature vector of phonemes that are dissimilar to corresponding phonemes in the phoneme sequence of the audio feature 206. Alternatively or additionally, the user-specific internal representation perturbation 212-2 could be a weighting that, for negative audio samples, decreases or masks subsamples values of the feature vector of phonemes that are similar to corresponding phonemes in the phoneme sequence of the audio feature 206, and that increases or passes values of the feature vector of phonemes that are dissimilar to the corresponding phonemes in the phoneme sequence of the audio feature 206.

At step 708, the audio processing application 142 processes the perturbed internal representation 306 with the audio feature detection model 144-2 to determine whether the audio sample 214 includes the audio feature 206. For example, the audio processing application 142 can determine whether the perturbed internal representation 306 is an internal representation that is consistent with an internal representation of the audio sample 214 the includes the audio feature 206. If so, the audio processing application 142 can generate and present the response 222 to the audio sample 214, such as responding to the audio feature 206 or providing a response to a query or command of the user 200; and if not, the device can refrain from providing a response 224.

In sum, techniques for training a user-specific perturbation generator for an audio feature detection model. The techniques include receiving one or more positive audio samples of a user, where each of the one or more positive audio samples include an audio feature that is to be detected and responded to. The techniques further include receiving one or more negative audio samples of the user, where each of the one or more negative audio samples shares an acoustic similarity with at least one of the one or more positive audio samples. A user-specific perturbation generator model in then adversarially trained to generate a user-specific perturbation that can improve the ability of an audio feature detection model to recognize the audio feature when it is present in an audio sample and to no recognize an audio sample that does not include the audio feature.

In some approaches, the user-specific perturbation is a user-specific audio sample perturbation that is used to perturb a subsequently received audio sample of the user. The perturbed audio sample is then processed by the audio feature detection model to determine whether the audio sample includes or does not include the audio feature. When the audio feature detection model determines that the audio sample include the audio feature, the techniques include generating a response to the audio sample. In other approaches, the user-specific perturbation is a user-specific internal representation perturbation that is used to perturb an internal representation of a subsequently received audio sample of the user, where the internal representation is a representation of the audio sample after partial processing of the audio sample by an audio feature detection model. The perturbed internal representation of the audio sample is then further processed by the audio feature detection model to determine whether the audio sample includes or does not include the audio feature. When the audio feature detection model determines that the audio sample include the audio feature, the techniques include generating a response to the audio sample.

At least one technical advantage of the disclosed techniques relative to the prior art is that, with the disclosed techniques, a device such as an intelligent personal assistant exhibits a reduced false negative rate of recognizing the audio feature in audio samples of the user, and/or a false positive rate of recognizing the audio feature in a negative audio sample of the user not including the audio feature, due to an acoustic similarity between one or more positive audio samples of the user that include the audio feature and negative audio samples of the user sharing an acoustic similarity with at least one of the one or more positive audio samples of the user. The reduced false negative rate can improve the responsiveness of the device to the user. The reduced false positive rate can conserve battery life or unnecessary processing of the device. Further, interactions between the user and the intelligent personal assistant are improved due to a reduced rate of the device listening to and responding to the user when not intended by the user, resulting in a higher-confidence user experience. These technical advantages provide one or more technological improvements over prior art approaches.

1. In some embodiments, a computer-implemented method of training a user-specific perturbation generator for an audio feature detection model comprises receiving one or more positive audio samples of a user, each of the one or more positive audio samples including an audio feature; receiving one or more negative audio samples of the user, each of the one or more negative audio samples sharing an acoustic similarity with at least one of the one or more positive audio samples; and adversarially training a user-specific perturbation generator model to generate a user-specific perturbation, the training based on the one or more positive audio samples and the one or more negative audio samples, wherein perturbation of audio samples of the user with the user-specific perturbation causes an audio feature detection model to recognize the audio feature in audio samples of the user that include the audio feature and to refrain from recognizing the audio feature in audio samples of the user that do not include the audio feature.

2. The computer-implemented method of clause 1, further comprising: selecting each of the one or more negative audio samples from a stored set of one or more negative audio samples sharing an acoustic similarity with at least one of the one or more positive audio samples.

3. The computer-implemented method of clauses 1 or 2, wherein adversarially training the user-specific perturbation generator model further comprises perturbing a first positive audio sample of the one or more positive audio samples with the user-specific perturbation to generate perturbed positive audio samples of the one or more positive audio samples, and adjusting the user-specific perturbation generator model to generate audio sample perturbations that increase an acoustic similarity between a predetermined audio sample that includes the audio feature and perturbed positive audio samples of the one or more positive audio samples.

4. The computer-implemented method of any of clauses 1-3, wherein adversarially training the user-specific perturbation generator model further comprises perturbing a first positive audio sample of the one or more positive audio samples with the user-specific perturbation to generate a perturbed positive audio sample, perturbing a first negative audio sample of the one or more negative audio samples with the user-specific perturbation to generate a perturbed negative audio sample, and adjusting the user-specific perturbation generator model to generate audio sample perturbations that decrease an acoustic similarity between the perturbed positive audio sample and the perturbed negative audio sample.

5. The computer-implemented method of any of clauses 1-4, wherein adversarially training the user-specific perturbation generator model further comprises perturbing an internal representation of a first positive audio sample of the one or more positive audio samples within an audio feature detection model with the user-specific perturbation to generate a perturbed internal representation of the first positive audio sample, and adjusting the user-specific perturbation generator model to generate internal representation perturbations that increase a similarity between an internal representation of a predetermined audio sample that includes the audio feature and the perturbed internal representation of the first positive audio sample.

6. The computer-implemented method of any of clauses 1-5, wherein adversarially training the user-specific perturbation generator model further comprises perturbing an internal representation of a first positive audio sample of the one or more positive audio samples within an audio feature detection model with the user-specific perturbation to generate a perturbed internal representation of the first positive audio sample, perturbing an internal representation of a first negative audio sample of the one or more negative audio samples within the audio feature detection model with the user-specific perturbation to generate a perturbed internal representation of the first negative audio sample, and adjusting the user-specific perturbation generator model to generate internal representation perturbations that decrease a similarity between the perturbed internal representation of the first positive audio sample and the perturbed internal representation of the first negative audio sample.

7. The computer-implemented method of any of clauses 1-6, wherein the user-specific perturbation is an audio sample perturbation with which an audio sample of the user is to be perturbed to generate a perturbed audio sample of the user.

8. The computer-implemented method of any of clauses 1-7, further comprising generating, by the user-specific perturbation generator model, the user-specific perturbation as an audio sample perturbation; and sending the audio sample perturbation to an audio feature detection model, wherein a perturbed audio sample based on an audio sample of the user perturbed by the audio sample perturbation is classified by the audio feature detection model to determine whether the audio sample includes the audio feature.

9. The computer-implemented method of any of clauses 1-8, further comprising perturbing an audio sample of the user with the user-specific perturbation to generate a perturbed audio sample; and sending the perturbed audio sample to an audio feature detection model, wherein the perturbed audio sample is classified by the audio feature detection model to determine whether the audio sample includes the audio feature.

10. The computer-implemented method of any of clauses 1-9, wherein the user-specific perturbation is an internal representation perturbation with which an internal representation of an audio sample of the user within an audio feature detection model is to be perturbed to generate a perturbed internal representation of the audio sample of the user.

11. In some embodiments, a non-transitory computer readable medium stores instructions that, when executed by a processor, cause the processor to perform the steps of receiving one or more positive audio samples of a user, each of the one or more positive audio samples including an audio feature; receiving one or more negative audio samples of the user, each of the one or more negative audio samples sharing an acoustic similarity with at least one of the one or more positive audio samples; and adversarially training a user-specific perturbation generator model to generate a user-specific perturbation, the training based on the one or more positive audio samples and the one or more negative audio samples, wherein perturbation of audio samples of the user with the user-specific perturbation causes an audio feature detection model to recognize the audio feature in audio samples of the user that include the audio feature and to refrain from recognizing the audio feature in audio samples of the user that do not include the audio feature.

12. The non-transitory computer readable medium of clause 11, further comprising selecting each of the one or more negative audio samples based on the one or more positive audio samples received from the user.

13. The non-transitory computer readable medium of clauses 11 or 12, wherein each of the one or more negative audio samples is a verbal expression of the user that shares an acoustic similarity with at least one of the one or more positive audio samples based on one or more of, an accent of the user, a dialect of the user, or a manner of speech of the user.

14. The non-transitory computer readable medium of any of clauses 11-13, wherein receiving the one or more negative audio samples of the user further comprises: requesting the user to provide the one or more negative audio samples.

15. The non-transitory computer readable medium of any of clauses 11-14, wherein the user-specific perturbation is an audio sample perturbation with which an audio sample of the user is to be perturbed to generate a perturbed audio sample of the user.

16. The non-transitory computer readable medium of any of clauses 11-15, wherein the user-specific perturbation is an internal representation perturbation with which an internal representation of an audio sample of the user within the audio feature detection model is to be perturbed to generate a perturbed internal representation of the audio sample of the user.

17. The non-transitory computer readable medium of any of clauses 11-16, wherein the acoustic similarity is at least one of, a frequency spectrum difference between a frequency spectrum of a first positive audio sample of the one or more positive audio samples and a frequency spectrum of a first negative audio sample of the one or more negative audio samples, the frequency spectrum difference being within a frequency spectrum difference threshold, or a phoneme sequence difference between a phoneme sequence of a first positive audio sample of the one or more positive audio samples and a phoneme sequence of a first negative audio sample of the one or more negative audio samples, the phoneme sequence difference being within a phoneme sequence difference threshold.

18. In some embodiments, a system that determines an interaction between a user and a device comprises a memory storing instructions, and one or more processors that execute the instructions to perform steps comprising receiving an audio sample from a user; receiving a user-specific perturbation associated with the user; and determining whether the audio sample includes an audio feature based on the audio sample and the user-specific perturbation.

19. The system of clause 18, wherein the user-specific perturbation is an audio sample perturbation with; and determining whether the audio sample includes the audio feature comprises perturbing the audio sample with the audio sample perturbation to generate a perturbed audio sample; and classifying the perturbed audio sample via an audio feature detection model.

20. The system of clauses 18 or 19, wherein the user-specific perturbation is an internal representation perturbation; and determining whether the audio sample includes the audio feature comprises processing the audio sample via an audio feature detection model to generate an internal representation of the audio sample; perturbing the internal representation with the internal representation perturbation to generate a perturbed internal representation; and classifying the perturbed internal representation via the audio feature detection model.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method of training a user-specific perturbation generator, comprising:
receiving one or more positive audio samples of a user, each of the one or more positive audio samples including an audio feature;
receiving one or more negative audio samples of the user, each of the one or more negative audio samples sharing an acoustic similarity with at least one of the one or more positive audio samples; and
adversarially training a first machine learning (ML) model comprising a user-specific perturbation generator model using the one or more positive audio samples and the one or more negative audio samples to produce a trained user-specific perturbation generator model that generates a user-specific perturbation comprising a bitmask for the user that is usable to increase or decrease at least one acoustic similarity of audio samples that are to be presented to a second ML model comprising an audio feature detection model,
wherein presenting a perturbed audio sample of the user, which is a subsequent audio sample that is perturbed by applying the bitmask to the audio feature detection model as an input increases a likelihood, relative to presenting the subsequent audio sample without applying the bitmask, that the audio feature detection model:
recognizes the audio feature when the perturbed audio sample includes the audio feature, and
refrains from recognizing the audio feature when the perturbed audio sample does not include the audio feature.

2. The computer-implemented method of claim 1, further comprising: selecting each of the one or more negative audio samples from a stored set of one or more negative audio samples sharing an acoustic similarity with at least one of the one or more positive audio samples.

3. The computer-implemented method of claim 1, wherein training the user-specific perturbation generator model further comprises:
applying the bitmask to a first positive audio sample of the one or more positive audio samples to generate perturbed positive audio samples of the one or more positive audio samples, and
adjusting the user-specific perturbation generator model to generate audio sample perturbations that increase an acoustic similarity between a predetermined audio sample that includes the audio feature and perturbed positive audio samples of the one or more positive audio samples.

4. The computer-implemented method of claim 1, wherein training the user-specific perturbation generator model further comprises:
applying the bitmask to a first positive audio sample of the one or more positive audio samples to generate a perturbed positive audio sample,
applying the bitmask to a first negative audio sample of the one or more negative audio samples to generate a perturbed negative audio sample, and
adjusting the user-specific perturbation generator model to generate audio sample perturbations that decrease an acoustic similarity between the perturbed positive audio sample and the perturbed negative audio sample.

5. The computer-implemented method of claim 1, wherein the trained user-specific perturbation generator model generates the perturbed audio sample by at least one of:
increasing a first acoustic similarity between the perturbed audio sample and a positive audio sample that includes the audio feature; or
decreasing the acoustic similarity between the perturbed audio sample and a negative audio sample that includes the audio feature,
wherein the acoustic similarity is based on one or more of an accent of the user, a dialect of the user, or a manner of speech of the user.

6. A non-transitory computer readable medium storing instructions that, when executed by a processor, cause the processor to perform the steps of:
receiving one or more positive audio samples of a user, each of the one or more positive audio samples including an audio feature;
receiving one or more negative audio samples of the user, each of the one or more negative audio samples sharing an acoustic similarity with at least one of the one or more positive audio samples; and
adversarially training a first machine learning (ML) model comprising a user-specific perturbation generator model using the one or more positive audio samples and the one or more negative audio samples to produce a trained user-specific perturbation generator model that generates a user-specific perturbation comprising a bitmask for the user that is usable to increase or decrease at least one acoustic similarity of audio samples that are to be presented to a second ML model comprising an audio feature detection model,
wherein presenting a perturbed audio sample of the user, which is a subsequent audio sample that is perturbed by applying the bitmask to the audio feature detection model as an input increases a likelihood, relative to presenting the subsequent audio sample without applying the bitmask, that the audio feature detection model:
recognizes the audio feature when the perturbed audio sample includes the audio feature, and
refrains from recognizing the audio feature when the perturbed audio sample does not include the audio feature.

7. The non-transitory computer readable medium of claim 6, further comprising: selecting each of the one or more negative audio samples based on the one or more positive audio samples received from the user.

8. The non-transitory computer readable medium of claim 6, wherein each of the one or more negative audio samples is a verbal expression of the user that shares an acoustic similarity with at least one of the one or more positive audio samples based on one or more of: an accent of the user, a dialect of the user, or a manner of speech of the user.

9. The non-transitory computer readable medium of claim 6, wherein receiving the one or more negative audio samples of the user further comprises: requesting the user to provide the one or more negative audio samples.

10. The non-transitory computer readable medium of claim 6, wherein the acoustic similarity is at least one of:
a frequency spectrum difference between a frequency spectrum of a first positive audio sample of the one or more positive audio samples and a frequency spectrum of a first negative audio sample of the one or more negative audio samples, wherein the frequency spectrum difference is within a frequency spectrum difference threshold, or
a phoneme sequence difference between a phoneme sequence of the first positive audio sample of the one or more positive audio samples and a phoneme sequence of the first negative audio sample of the one or more negative audio samples, the phoneme sequence difference being within a phoneme sequence difference threshold.

11. The non-transitory computer readable medium of claim 6, wherein the steps further comprise generating a response upon determining that the subsequent audio sample includes the audio feature.

12. The non-transitory computer readable medium of claim 11, wherein the response comprises at least one of:
- an acknowledgment indicating that the device is active and ready to receive further input;
- an acknowledgment of an action of the device taken in response to the audio feature, wherein the audio feature includes a command; or
- an answer to the audio feature, wherein the audio feature includes a query.

13. A system that determines an interaction between a user and a device, comprising:
- a memory storing instructions, and
- one or more processors that execute the instructions to perform steps comprising:
  - receiving an audio sample from a user;
  - receiving a user-specific perturbation associated with the user, the user-specific perturbation comprising a bitmask that has been generated by a machine learning (ML) model comprising a previously trained user-specific perturbation generator model that was adversarially trained using positive audio samples of the user and negative audio samples of the user;
  - applying the bitmask on the audio sample to increase or decrease at least one acoustic similarity of the audio sample to generate a perturbed audio sample; and
  - determining, based on a second ML model comprising a trained audio feature detection model classifying the perturbed audio sample, whether the audio sample includes an audio feature, wherein the perturbed audio sample increases a likelihood, relative to presenting the audio sample, that the classification is correct.

14. The system of claim 13, wherein the steps further comprise:
- generating a response upon determining that the perturbed audio sample includes the audio feature, the response including at least one of:
  - an acknowledgment indicating that the device is active and ready to receive further input;
  - an acknowledgment of an action of the device taken in response to the audio feature, wherein the audio feature includes a command; or
  - an answer to the audio feature, wherein the audio feature includes a query; or
- refraining from generating the response upon determining that the perturbed audio sample does not include the audio feature.

* * * * *